(12) United States Patent
Schiller et al.

(10) Patent No.: US 8,818,082 B2
(45) Date of Patent: Aug. 26, 2014

(54) CLASSIFYING BLUR STATE OF DIGITAL IMAGE PIXELS

(71) Applicant: Adobe Systems Incorporated, San Jose, CA (US)

(72) Inventors: Stephen N. Schiller, Oakland, CA (US); Scott D. Cohen, Sunnyvale, CA (US); Jingnan Wang, Evanston, IL (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/958,044

(22) Filed: Aug. 2, 2013

(65) Prior Publication Data

US 2013/0315478 A1    Nov. 28, 2013

Related U.S. Application Data

(63) Continuation of application No. 12/956,996, filed on Nov. 30, 2010, now Pat. No. 8,503,801.

(60) Provisional application No. 61/384,907, filed on Sep. 21, 2010.

(51) Int. Cl.
*G06K 9/62* (2006.01)
*G06K 9/20* (2006.01)
*G06T 11/60* (2006.01)
*G06K 9/46* (2006.01)
*G06K 9/40* (2006.01)

(52) U.S. Cl.
CPC .............. *G06T 11/60* (2013.01); *G06K 9/6278* (2013.01); *G06K 9/209* (2013.01); *G06K 9/4647* (2013.01); *G06K 9/40* (2013.01)
USPC ......................................................... 382/159

(58) Field of Classification Search
USPC .......................................................... 382/159
See application file for complete search history.

(56) References Cited

U.S. PATENT DOCUMENTS 7,212,668 B1 * 5/2007 Luo et al. ....................... 382/165
8,428,390 B2 * 4/2013 Li et al. .......................... 382/274
8,503,801 B2   8/2013 Schiller et al.

(Continued)

OTHER PUBLICATIONS (Fred; "Fred Internet Archived"; Jun. 4, 2008; https://web.archive.org/web/20090207091003/http://fmwconcepts.com/imagemagick/variableblur/index.php).*

(Continued)

*Primary Examiner* — Samir Ahmed
*Assistant Examiner* — Totam Le
(74) *Attorney, Agent, or Firm* — Wolfe-SBMC

(57) ABSTRACT

A blur classification module may compute the probability that a given pixel in a digital image was blurred using a given two-dimensional blur kernel, and may store the computed probability in a blur classification probability matrix that stores probability values for all combinations of image pixels and the blur kernels in a set of likely blur kernels. Computing these probabilities may include computing a frequency power spectrum for windows into the digital image and/or for the likely blur kernels. The blur classification module may generate a coherent mapping between pixels of the digital image and respective blur states, and/or may perform a segmentation of the image into blurry and sharp regions, dependent on values stored in the matrix. Input image data may be preprocessed. Blur classification results may be employed in image editing operations to automatically target image subjects or background regions, or to estimate the depth of image elements.

20 Claims, 10 Drawing Sheets

(56) References Cited

U.S. PATENT DOCUMENTS

| | | |
|---|---|---|
| 2006/0115174 A1 | 6/2006 | Lim et al. |
| 2009/0096808 A1* | 4/2009 | Winn et al. .................. 345/594 |
| 2009/0161977 A1 | 6/2009 | Shiraki et al. |
| 2009/0316995 A1 | 12/2009 | Szeliski et al. |
| 2010/0086232 A1 | 4/2010 | Sun et al. |
| 2010/0123807 A1 | 5/2010 | Lee et al. |
| 2010/0202677 A1 | 8/2010 | Imamura et al. |
| 2010/0208944 A1 | 8/2010 | Fukunishi |
| 2010/0246939 A1 | 9/2010 | Aisaka et al. |
| 2010/0272356 A1 | 10/2010 | Hong |
| 2013/0129233 A1 | 5/2013 | Schiller et al. |
| 2014/0104458 A1* | 4/2014 | Tanaka ......................... 348/239 |

OTHER PUBLICATIONS

Chakrabarti, et al.,"Analyzing Spatially-varying Blur", Proceedings of IEEE 2 Conference on Computer Vision and Pattern Recognition (CVPR). San Francisco, CA. Jun. 3-18, 2010. pp. 2512-2519, Jun. 2010, 8 Pages.

Namboodiri, et al.,"Regularized Depth From Defocus", Proceedings of International Conference on Image Processing (ICIP), San Diego, CA, USA, 2008. pp. 1520-1523, 2008, 4 Pages.

"Non-Final Office Action", U.S. Appl. No. 12/956,996, Oct. 25, 2012, 15 pages.

"Notice of Allowance", U.S. Appl. No. 12/956,996, Apr. 8, 2013, 8 pages.

* cited by examiner

CLASSIFYING BLUR STATE OF DIGITAL IMAGE PIXELS

RELATED APPLICATIONS

This application is a continuation of and claims priority to U.S. patent application Ser. No. 12/956,996, filed Nov. 30, 2010, entitled "System and Method for Classifying the Blur State of Digital Image Pixels," which claims priority to U.S. Provisional Application Ser. No. 61/384,907 entitled "System and Method for Segmenting a Digital Image Into Sharp and Out-of-Focus Regions" filed Sep. 21, 2010, the contents of which are incorporated by reference herein in their entirety.

BACKGROUND

It is common in a digital photo for the subject of interest to be in focus and for the remaining background, or possibly foreground, to be more or less out of focus. An artist or photo editor will often want to edit the subject of interest in a photo, or the background, separately from the rest of the image. For example the artist may want to obscure, darken or lighten the background. Conversely, the artist may want to enhance the contrast or lighting only in the subject of interest.

It is also often desirable to estimate the distance of objects in a digital photo from the camera. This allows one, for example, to reconstruct a 3D scene from a photograph. This information is typically referred to as "depth" information. The computation of depth information usually requires two photos of the same scene, typically taken at the same time but from slightly different vantage points (i.e. a stereo pair). However, the degree of defocus in a photo can also be correlated with the distance of points in the photo from the camera, especially if one knows the focus setting and aperture setting for the lens that took the picture. Defocus estimates can be useful either alone or in conjunction with a stereo pair to estimate depth information for a photo.

One previously proposed method of estimating the amount of defocus in an image uses the technique of "inverse diffusion." One problem with this approach is that blur is assumed to arise from a Gaussian blur kernel, which is not an accurate model of the physical process involved. Also, in observed results, the content of the image tends to unduly affect the blur estimate. For example, shadows are often given a different blur estimate than adjacent non-shaded regions, and even smooth backgrounds may not have a single uniform blur estimate.

Another proposed method estimates blur based on the power spectrum of local windows into the image. However, this method is limited to one-dimensional (1D) blur kernels. It also uses a sharp edged window, which makes it impossible to distinguish the sharp edge of the window from sharp edges in the image. In addition, the segmentation generated with this method can only distinguish between part of the image blurred with one blur kernel and those parts of the image that are not blurred with this one kernel. For example, it operates on the assumption that a single, "most likely" blur kernel blurs some part of the image and not others.

SUMMARY

Various embodiments of systems and methods for classifying the blur state of digital image pixels are described herein. In some embodiments, a blur classification module may be configured to compute the probability that a given pixel in a digital image was blurred using a given two-dimensional blur kernel, and to store the computed probability in a blur classification probability matrix. The blur classification probability matrix may store a plurality of values, each indicating the probability that a particular pixel in the digital image was blurred using a particular two-dimensional blur kernel. In other words, the blur classification module may be configured to compute a blur classification probability value for all combinations of the pixels of the digital image and the blur kernels in a set of two or more blur kernels when performing a blur classification exercise. In some embodiments, computing these probabilities may include computing a frequency power spectrum for pixels of the digital image in multiple windows into the digital image and/or computing a frequency power spectrum for each of the blur kernels in a set of likely blur kernels.

In some embodiments, a blur classification module may be configured to generate a coherent mapping between each pixel of the digital image and a respective one of a set of possible blur states indicating the degree of blur at the pixel dependent, at least in part, on the values stored in a blur classification probability matrix. Generating the coherent mapping may include solving a labeling problem using an alpha expansion technique. In some embodiments, a blur classification module may be configured to perform a binary segmentation of a digital image into blurry and sharp regions dependent, at least in part, on the values stored in a blur classification probability matrix. Performing the binary segmentation may be further dependent on one or more of: the colors of the pixels in the digital image, the difference between the colors of two or more neighboring pixels in the digital image, or feedback indicating an incorrect labeling of one or more pixels of the digital image in the binary segmentation In some embodiments, a blur classification module may be configured to access data representing a digital image, and to pre-process that image data prior as part of a blur classification exercise. For example, the blur classification module may be configured to produce modified image data by performing one or more of: generating horizontal and vertical gradients of the digital image, converting the image data to a floating point format, reversing a correction induced by the format of the image data, or converting the image data to a grayscale format. In such embodiments, some or all of the subsequent operations performed as part of the blur classification exercise (e.g., computing the frequency power spectrum in various image windows) may be performed on this modified image data, rather than on the input image data. In some embodiments, computing the frequency power spectrum may be dependent on one or more of: a selected filter basis, a window size parameter value, or a noise level parameter value, and the final labeling of the pixels may be dependent on a pixel coherence parameter value.

In some embodiments, the results of a blur classification exercise described herein (e.g., a coherent blur mapping and/or a binary image segmentation) may be employed in a subsequent image editing operation in an image editing application. For example, in some embodiments, a user may be able to specify that a given editing operation (e.g., a change in lighting, color, contrast, or other image characteristics, or a cropping, scaling, or other type of image editing operation) be directed to the "subject" of a digital image, or to the "background" in a digital image. In such embodiments, the image editing application may be configured to perform the operation on portions of the image for which the blur state has a particular value (e.g., "blurry" or "sharp"), or a value within a particular range of values, without the user needing to explicitly identify a "subject" or "background" portion of the image. In some embodiments, the values stored in a blur classification probability matrix or resulting from a coherent blur mapping may be employed in an operation to estimate the depth of one or more elements in a digital image.

Figure 1:
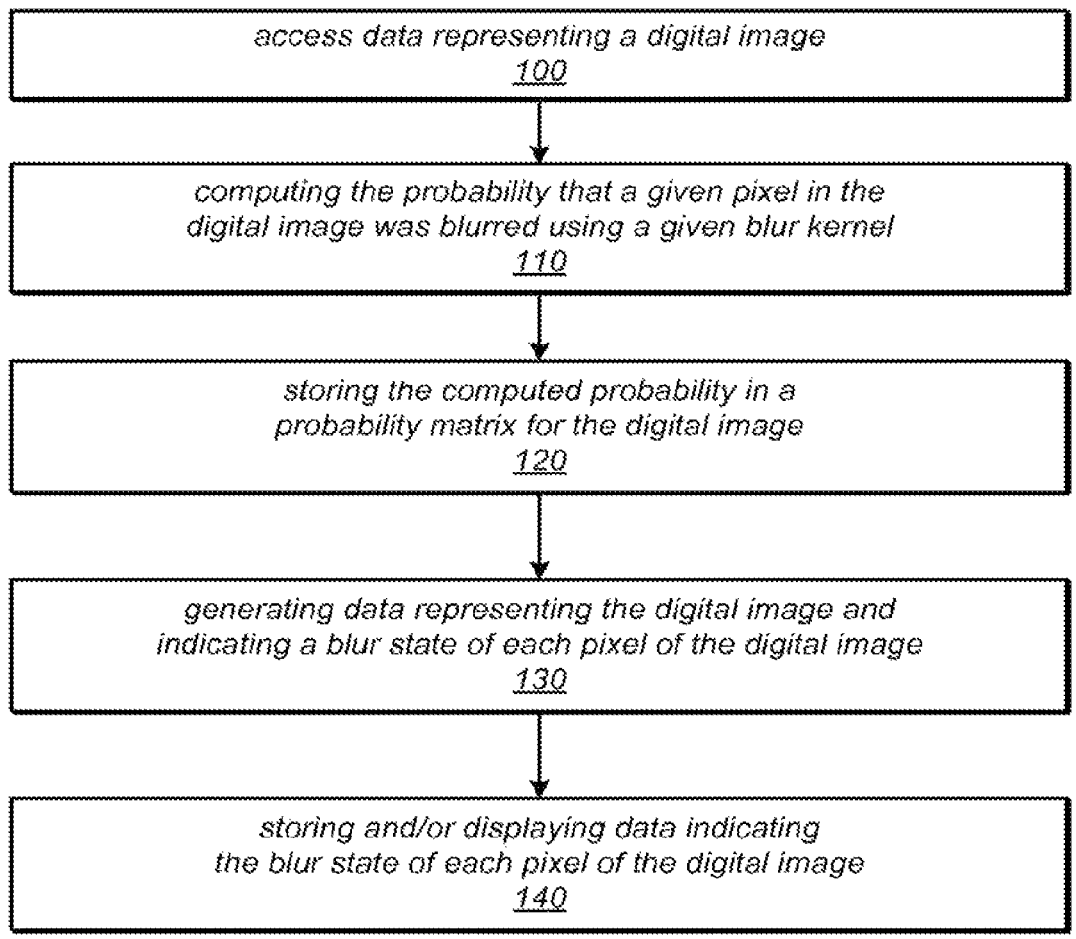
FIG. 1 is a flow diagram illustrating a method for classifying the blur state of pixels in a digital image, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of the disclosed embodiments. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of systems and methods for classifying the blur state of pixels in a digital image with little or no user intervention are described herein. For example, the blur classification techniques may be used to segment a digital image into sharp and blurry (i.e. out-of-focus) regions. In some embodiments, the systems described herein may provide an automatic or semi-automatic way of selecting those pixels in a digital image corresponding to the sharp areas of an image. It is understood that the complement of this group of pixels (the blurry, or out-of-focus pixels) may be readily selectable once the former have been identified. In some embodiments, the blur classification techniques described herein may be used to produce a coherent mapping of the pixels in a digital image to more than two blur states, indicating that different portions of the digital image are blurred by different amounts and/or by different blur functions.

In some embodiments, the methods described herein may be used to estimate the amount of blur present at any location in a digital image in order to identify portions of the image on which to operate. For example, a user may wish to adjust color, light, contrast, or other parameters only in the portion of the image that depicts the subject of the image or only in the background portions of the image. In other embodiments, the methods described herein may be used to estimate the amount of blur present at any location in a digital image as an aid to depth estimation. The degree of blur at a given pixel may in some embodiments be represented as an integer or floating point number (e.g., a value ranging from 0 to about 20), which indicates the radius, in pixels, of the blur disc most likely to have blurred the image at a given point. As used in the examples described herein, the formal definition of a sharp image $I_{sharp}$ being blurred by a disc of radius N is that in the corresponding blurry image, $I_{blurry}$, a pixel at location P in $I_{blurry}$ is the average of all the pixels whose distance from P in $I_{sharp}$ is less or equal to N. In other words, a blur kernel may, for each pixel, compute the average of the pixels in its neighborhood, according to a particular weighting that is applied to its neighbors. Different blur kernels may apply different weighting schemes. For example, with a motion blur kernel, only the pixels to the right and left of the central pixel may be considered, or they may be weighted more heavily than other pixels in the neighborhood of the central pixel.

In some embodiments, the systems described herein may extend a scheme for estimating blur based on the power spectrum of local windows into the image such that the method handles any 2D blur kernels. In particular, the methods described herein may handle blur kernels corresponding to camera lens blur (i.e. disc kernels). For example, such blur kernels may represent the smearing of the image by moving the camera lens horizontally or vertically. The methods described herein may use a Gaussian window, rather than a sharp edged window, to process the digital image, making it possible to distinguish the sharp edge of the window from sharp edges in the image itself. In various embodiments, these windows may have any one of a variety of shapes, or different windows may be of different shapes. The methods described herein may also be more flexible than previous techniques in that they may be able to distinguish between areas of the image that are blurred with multiple (but different) blur kernels. In some embodiments, the method may use a radial basis function to save time.

As described in more detail below, the first half of a method for classifying the blur state of the pixels in a digital image may assign a set of probabilities to each location (e.g., pixel) in an image corresponding to the likelihood that the given point was blurred with any of a set of blur kernels. This data may be referred to herein as a "blur classification probability matrix". This information may then be used to produce a blur map (i.e. a map of the amount of blur at each pixel) and/or a segmentation of the image into sharp and blurry regions, in various embodiments.

A method for classifying the blur state of pixels in a digital image is illustrated by the flow diagram in FIG. 1, according to one embodiment. In various embodiments, the operations illustrated in FIG. 1 may be implemented in software, in hardware, or in a combination of hardware and software. For example, in some embodiments, they may be performed by one or more modules of an image editing application that provides a blur classification feature or by one or more standalone software modules configured to perform these operations. As illustrated at 100, in this example, the method may include accessing data representing a digital image. For example, data representing an input image may be obtained from data storage in response to user input selecting an existing image for editing. In some embodiments, a picture may be taken with a digital camera, or an image that already exists on film or paper may be scanned in to produce a digital image. The digital image may be uploaded to a computer where it may be accessed for editing.

As shown at 110, the method illustrated in FIG. 1 may include computing the likelihood that a given pixel in the digital image was blurred using a given blur kernel (e.g., a 2D blur kernel), which may include computing a frequency power spectrum for various image windows and the blur kernels, as described in more detail below. In other embodiments, the method may employ other approaches to computing the likelihood (e.g., a wavelet-based computation). As shown in 120, the results of this computation may be stored as a probability value in a blur classification probability matrix, which is sometimes referred to herein as L for likelihood. In this example, L may store the probability that a given pixel P in the image was blurred by a given kernel B(j), and may store other values, each indicating the probability that a particular pixel was blurred using a particular two-dimensional blur kernel. In other words, L may store probability values indicating the likelihoods of all combinations of pixels and blur kernels. Thus the array L may be indexed by both the pixel position P and the kernel index j.

As described in more detail herein, the values stored in a blur classification probability matrix may be subsequently used to generate data representing the digital image and indicating a blur state of each pixel of the digital image, as in 130. For example, these probability values may be used to generate a binary segmentation of the digital image into sharp and blurry regions, or a coherent blur mapping between image pixels and more than two blur states, as described in more detail. As illustrated in FIG. 1, the method may include storing and/or displaying data indicating the blur state of each pixel of the digital image, as in 140. For example, the method may include storing a mapping of pixels to blur states in an array indexed by pixel location, or displaying a binary image mask indicating the segmentation of the digital image into sharp and blurry regions, in various embodiments.

Figure 2:
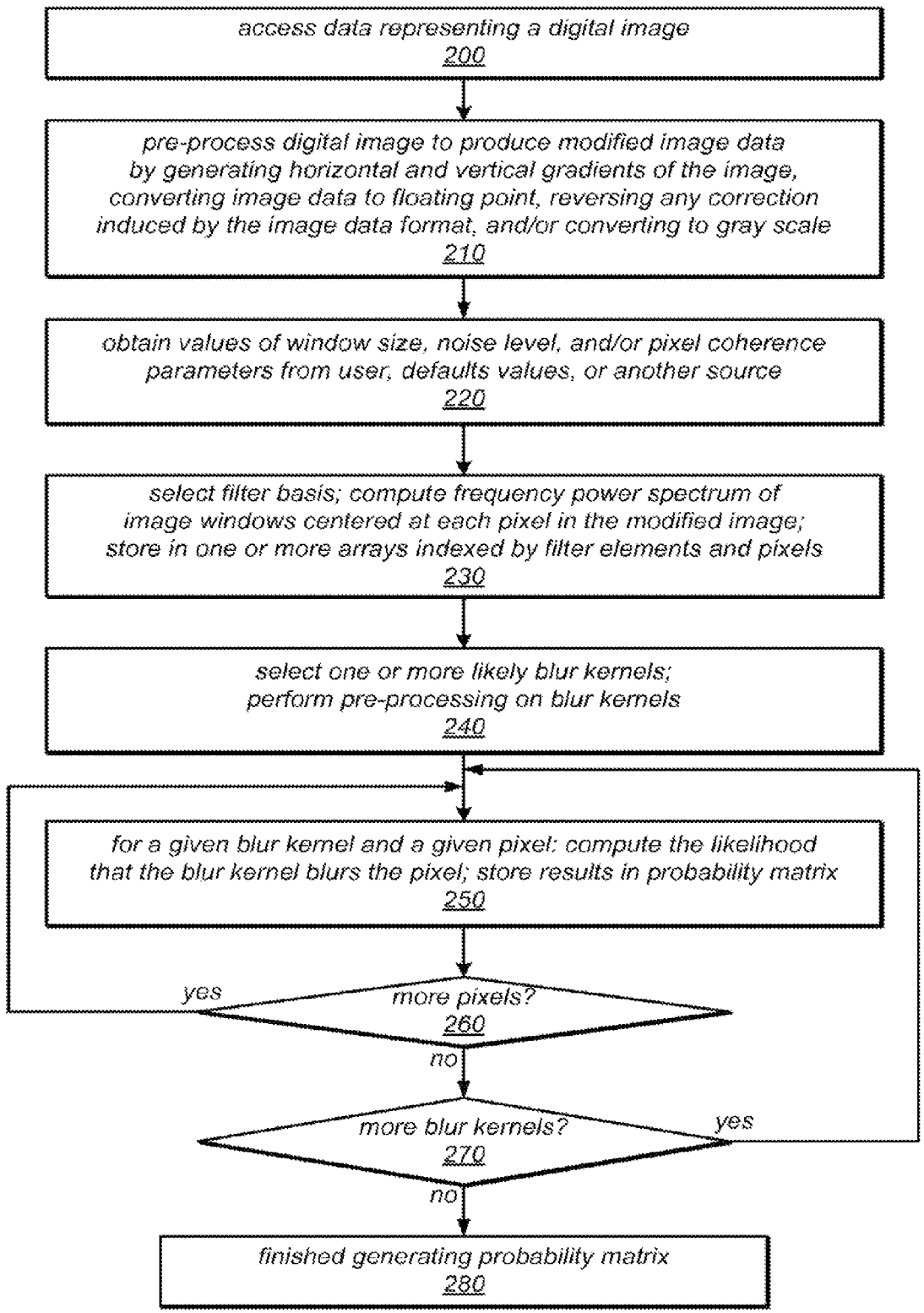
FIG. 2 is a flow diagram illustrating a method for generating a probability matrix whose values represent the likelihood that particular pixels of a digital image were blurred using particular blur kernels, according to some embodiments.

FIG. 2 is a flow diagram illustrating a method for generating a probability matrix whose values represent the likelihood that particular pixels of a digital image were blurred using particular blur kernels, according to some embodiments. In various embodiments, the operations illustrated in FIG. 2 may be implemented in software, in hardware, or in a combination of hardware and software. For example, in some embodiments, they may be performed by one or more modules of an image editing application or by one or more standalone software modules configured to perform them. As illustrated at 200, in this example, the method may include accessing data representing a digital image. For example, data representing an input image may be obtained from data storage in response to user input selecting an existing image for editing. In some embodiments, a picture may be taken with a digital camera, or an image that already exists on film or paper may be scanned in to produce a digital image. The digital image may be uploaded to a computer where it may be accessed for editing.

As illustrated at 210, the method may include pre-processing the input digital image (as needed) to produce modified image data. In various embodiments, this pre-processing may include generating horizontal and vertical gradients of the image (as described below), converting the image data to floating point data, reversing any correction induced by the image data format, and/or converting the image data to gray scale (as necessary) to produce modified image data. For example, various types of digital images may be stored on the computer as 2D arrays of 8-bit or 16-bit integers. Such integer formats may be linearly scaled to floating point values such that the maximum possible 8-bit or 16-bit integer is mapped to a floating point 1 and the integer 0 is mapped to a floating point 0. For some types of image formats, such as JPEG, gamma correction that has been applied to each image channel may be reversed, e.g., by raising each floating-point value to the power 2.2. This may return the lighting value in the image to one better representing the lighting that was sensed by the camera, for example. In some embodiments, a gray scale version of the image may be computed if the image has two or more color channels. For example, if a digital image is stored in the RGB format, the standard weighted average of the red, green, blue channels may be taken to obtain a gray scale image. In the detailed description that follows, the term "image" may refer to this modified gray scale image, unless some version of an original color input image is explicitly referenced.

Note that in some embodiments, the methods described herein may be improved by considering the red, green and blur channels of color image separately up to and including the point of computing the blur classification probability matrix. In such embodiments, the probability matrices for each channel may be combined when determining a classification result for a given pixel. This may in some cases yield a more accurate result, as one or more of the color channels may contribute more useful information than that contributed by a single gray scale channel. However, this approach may be more time consuming than an approach that operates on a grey scale image.

As illustrated at 220, the method for generating a blur classification probability matrix may include selecting and/or otherwise obtaining the values of one or more parameters to be used in subsequent computations in a blur classification exercise. In various embodiments, these parameters may include window size, noise level, and/or pixel coherence. These values may be entered by a user through a GUI of the image editing application, may be selected by the user from a set of available values, may be default values provided by the system, or may be obtained from a configuration file or another source, in different embodiments.

In the example illustrated in FIG. 2, the "window size" parameter may represent the diameter of a square sub-window into the image. For a given pixel P, a window of this size is centered at P and all pixels inside this window are used to compute the blur at the pixel P. There are various tradeoffs to be made in selecting the window size, in different embodiments. For example, if the window size is too large, the window may more often overlap areas that are both blurred and not blurred, and thus may more often give ambiguous results. However, if the window size is too small, there may not be enough data to accurately estimate the blur. Thus, the estimates may be erratic and may be influenced by the content of the image more than by the blur of the image. In various embodiments, the method may typically use a window size that is three to four times the diameter of the largest blur that expected to be encountered. In some embodiments, the window size may be selected such that, at a minimum, it is larger than the largest blur kernel in the set.

In the example illustrated in FIG. 2, the "noise level" parameter (or Z) for the image may represent an estimate of the amount of signal corruption in the image data after the blur occurred. This may typically be a result of a combination of camera sensor noise and the effects of the quantization of analog levels to integer levels in the digital image representation. For example, it may be at least partially the result of an analog-to-digital conversion operation or the result of variations in lighting across the image captured by a camera. In some embodiments, values for the noise level parameter may be expressed as additive random values from normal distribution with standard deviation, Z, in the range from 1E-3 to 1E-5.

In the example illustrated in FIG. 2, the "pixel coherence" parameter (or $\lambda$) may control how closely the blur amount assigned to a pixel P depends on the blur amount assigned to its neighbors. For example, if this value is high, the blur classification process may attempt to make the blur amounts continuous, at the cost of ignoring small variations in any initial estimates from one pixel to the next. On the other hand, if this value is low, the blur classification process may attempt to follow any initial blur estimates more closely, at the expense of producing a potentially noisy and jagged output data. The pixel coherence parameter and the effect of its value are described in more detail below.

Information about blur may in some embodiments be analyzed by means of a frequency power spectrum. As illustrated at 230, the method for generating a blur classification probability matrix shown in FIG. 2 may include computing the frequency power spectrum of image windows centered at each pixel in the (modified, grey scale) image. As illustrated in this example, the first step in computing the frequency power spectrum may be to select a "filter basis." This filter basis may include a set of functions (sometimes referred to herein as "filter elements") defined over the same spatial extent as the window. Each such function may represent a different spatial frequency, or a group of related spatial frequencies. Again, the filter basis may be selected or entered by a user, or may be a default value provided by the system, in different embodiments. This filter basis may be used in computing the frequency power spectrum of image windows centered at each pixel in the modified image, and the results of this computation may be stored in one or more arrays indexed by the filter elements and the locations of the pixels at which each image window is centered.

The frequency power spectrum relates how much different spatial frequencies contribute to information in an image, or in this example, the portion of an image inside a square window centered at a given pixel. In the description below, the terms "window" or "image window" may refer to the sub-image of the image taken from a square window of diameter "window size" pixels, centered around some pixel P=(x,y) in the image. Note that in some embodiments, if the window centered at P goes outside the boundary of the image, those pixels may be set to zero in the window. In other embodiments, other methods of filling in these out of bounds values may be used. For example, values of the image may be reflected into the out of bounds portion of the window.

In some embodiments, the method for generating a blur classification probability matrix may include selecting one or more likely blur kernels (e.g., a blur kernel set) to be used in the blur classification exercise, as in 240. As illustrated in this example, the method may include performing a pre-processing operation on those blur kernels to compute the frequency power spectrum of each. This information may then be stored for use in subsequent computations.

As shown in FIG. 2, the method for generating a blur classification probability matrix may include, for each blur kernel and each pixel, computing the likelihood that the blur kernel blurs the pixel. This is illustrated in FIG. 2 at element 250, and by the feedback from 260 to 250 and the feedback from 270 to 250. In other words, the method may include iterating over all pixels in the digital image and over all blur kernels in the selected blur kernel set until the likelihoods for all combinations of pixels and blur kernels have been computed and stored. Once all of these likelihoods have been computed, shown as the negative exit from 270, the generation of the blur classification probability matrix may be complete, as in 280. As previously noted, the blur classification probability matrix may in some embodiments be stored as an array L that is indexed by both the pixel position P and the kernel index j. As described in more detail herein, this blur classification probability matrix may be subsequently used to compute coherent blur maps and/or binary segmentations of the image.

A spatial frequency is a complex wave function that oscillates in a particular direction and with a definite period. It is complex in that the real and imaginary parts are sinusoids of equal magnitude and 90 degrees out of phase. This is called a pure sinusoid and is the simplest spatial (i.e. 2D) filter function. The frequency of such a pure sinusoid may be specified by a vector $(f_x, f_y)$, which gives both the direction and the period of the sinusoid. The exact formula as a function of spatial position (x,y) is as follows:

$$F(x,y)=\exp((xf_x+yf_y)2\pi i)$$

Another variation on a filter element is a product of a pure sinusoid with a 2D Gaussian function. In some embodiments, the system described herein may use a 2D Gaussian window that is centered in the image window and whose standard deviation is about ¼ of the diameter of the window size. This may have the advantage of tapering values down to zero as they approach the edges of the window. Otherwise, the edge of the window may appear to be a sharp edge in the image and may mask the true power spectrum frequency response.

In one embodiment, the filter basis may consist of pure sinusoids whose corresponding frequency vectors, $(f_x, f_y)$, are equally spaced in the frequency domain and are equal in number to the area of the image window. In some embodiments, if a Gaussian window is used, the number of pure sinusoids may be approximately equal to the volume under the Gaussian window, i.e. the sum of the Gaussian window elements. In such embodiments, the highest frequency element may have a period of about four pixels, and the zero-frequency, or constant sinusoid, may not be used.

In still other embodiments, the methods described herein may combine all of the pure sinusoids with the same spatial frequency into one filter element. The resulting function may look like a radial wave emanating from a central point, and may thus be referred to as a "radial basis". This basis may have the advantage that there are many fewer elements to the filter basis than with other approaches, which may speed up all subsequent computations. Normally, there would be some sacrifice of information by combining many filter elements into one. However, since the blur kernels being dealt with are radially symmetric already, there may actually be very little information loss.

One method of computing a radial filter element is to take the inverse Fourier transform of a 2D data array that has absolute value of 1 in a ring of distance F from the (0,0) position, and that has a symmetric real part and an anti-symmetric imaginary part, where F is the spatial frequency of the radial basis element. There are two ways of producing the anti-symmetric imaginary part that yield orthogonal filters, and thus there are actually two radial filters per frequency F. In some embodiments, the radial basis may also be multiplied by a Gaussian, as mentioned above. This may serve to erase sharp edges from the window.

In some embodiments, to obtain the "frequency response" corresponding to a particular element in the filter basis of the signal in an image window, the system may take the first element-wise product of the real part of each filter element with each corresponding window element, may sum the results, and may save them in a temporary variable, A. The system may next do the same with the imaginary part of the filter element, and may save the results in a temporary variable B. In this example, the frequency response may then be as follows:

$$R=\sqrt{A^2+B^2}$$

In some embodiments, rather than computing the power spectrum of the input image itself, the system may be configured to compute the power spectrum of the X and Y gradients of the image. The X and Y gradients of the image reflect the differences between adjacent pixels horizontally and vertically, respectively. In other words, the system may be configured to generate X and Y gradient images and to compute the power spectrum of the resulting windows of these gradient images.

As a notational convention, index elements of the filter basis may be represented herein by "i", so that the $i^{th}$ filter will be denoted F(i). Likewise, the $i^{th}$ filter response for the window centered at position P will be denoted $R_x(P, i)$ or $R_y(P, i)$ for the X and Y gradients, respectively. In the examples described herein, N may denote the number of elements in the filter basis.

Given the above, the computation that is performed at this step in the blur classification exercise is to compute the frequency response, i.e. the arrays $R_x(P,i)$ and $R_y(P,i)$, for i=1 to N, and for P, iterating over all pixel positions in the image.

Note that the blur induced by an out-of-focus lens may in some embodiments be accurately modeled by a blur kernel that has a constant value inside a circle or regular polygon with five or more sides, and that is zero outside of the circle or regular polygon. For example, various polygonal shapes may come from the shape of the camera shutter. However, using a circular blur kernel has been found to work well in practice. In the descriptions herein, such circular blur kernels may be referred to as "disk kernels." Note that if the camera that was used to produce a digital image is known, the method may in some embodiments tailor the blur kernels to exactly match those of the camera for greater accuracy.

As noted above, at this point in the computation, a representative set of blur kernels may be chosen that will model (to a good degree) the blur found in all areas in the image under consideration, with the exception that in some embodiments it may not be necessary to model those areas of the image that are blurred by a disk kernel larger than about 20 pixels in diameter. In such embodiments, all of those very blurred areas may be adequately modeled by the largest blur kernel in the set. In various embodiments, the selection of the set of blur kernels may be automatic (i.e. performed by a blur classification module), may be influenced by user input, or may be based on default values for the system.

The chosen blur kernels may be referred to herein as the "kernel set." In some embodiments, the system may employ a kernel set comprising disc kernels whose radii are integers (in units of pixels) from 0 to about 10. In this example, a radius of 0 may correspond to no blur. Note that in various embodiments, the radii may not need to be exact integers, but the best result may be obtained when they are evenly spaced. For example, it may be advantageous to have the radii in an arithmetic sequence, such as 0, 1.5, 3.0, and 4.5. In different embodiments, it may be advantageous to use fewer blur kernels (e.g., to save time) or to use more blur kernels (e.g., in the case of a high resolution image). In the notation used herein, there are M kernels in the kernel set, and they are indexed by j. The $j^{th}$ blur kernel in the set will be denoted B(j).

As a preprocessing step, the system may be configured to compute the frequency power spectrum of each of the possible blur kernels (or each of the likely blur kernels selected for inclusion in the kernel set), just as was done for each of the possible image windows. This information may be computed and stored in a two-dimensional array U that is indexed by filter basis i and kernel j.

Note that the system described herein may use any set of blur kernels. For example, to detect motion blur as well as lens blur, the system may include motion blur kernels in the kernel set. In general, there may not be a limit as to the type or number of blur kernels used. However, the processing time may increase linearly with the number of kernels in the set.

Also note that if the blur kernels are not radially symmetric, it may not be optimal to use the radial filter basis mentioned above in the computations described herein.

Figure 3:
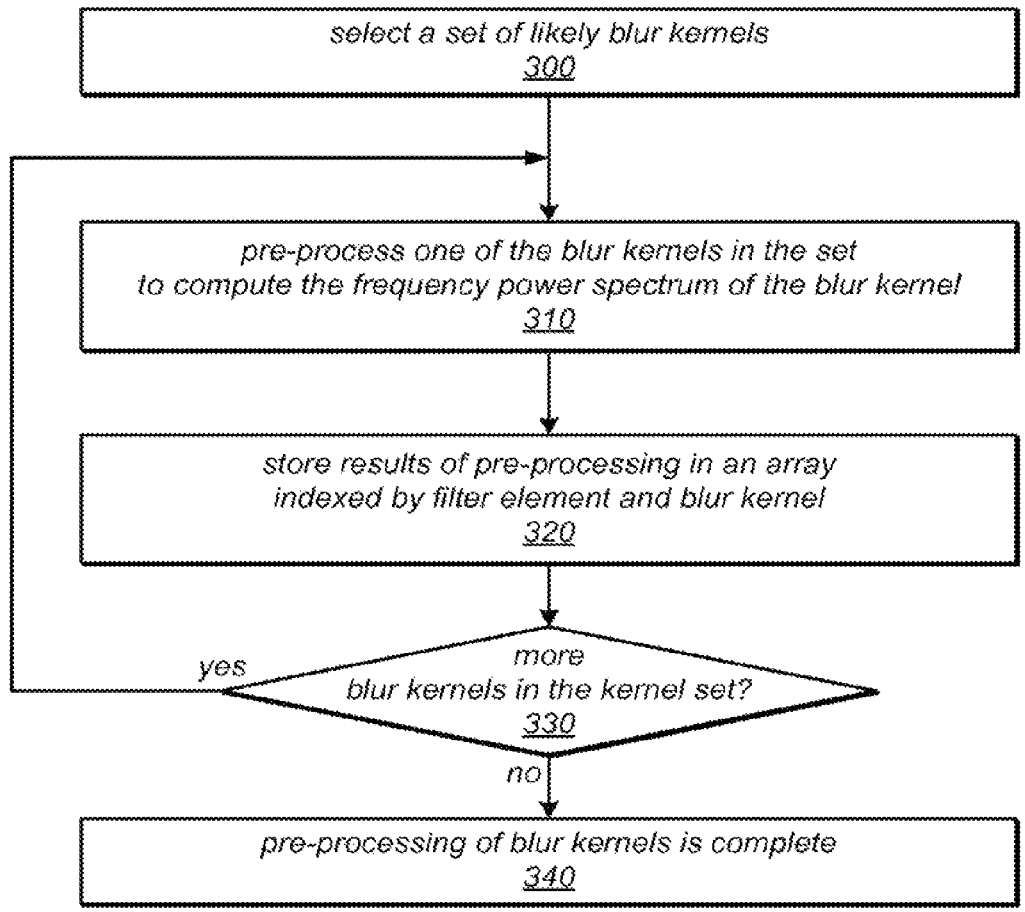
FIG. 3 is a flow diagram illustrating a method for pre-processing a set of blur kernels, according to some embodiments.

FIG. 3 is a flow diagram illustrating a method for pre-processing a set of blur kernels, according to some embodiments. In various embodiments, the operations illustrated in FIG. 3 may be implemented in software, in hardware, or in a combination of hardware and software. For example, in some embodiments, they may be performed by one or more modules of an image editing application or by one or more standalone software modules configured to perform them. As illustrated at 300, in this example, the method may include selecting one or more likely blur kernels. In various embodiments, the blur kernels in the set may be selected automatically from a representative set of blur kernels, may consist of a pre-defined set of blur kernels, may be selected by a user from available options, and/or may be selected automatically based on a user specification of the number of blur kernels to be included in the set. The method may include preprocessing one of the blur kernels in the set of blur kernels to compute the frequency power spectrum of the blur kernel, as shown in 310 and described above.

The results of this pre-processing may be stored for use in subsequent computations, as in 320. For example, they may be stored in an array indexed by an identifier of a filter element (e.g., a filter element number) and an identifier of the blur kernel (e.g., a blur kernel number, which in some embodiments may represent the blur radius or another parameter of the blur kernel). If there are more blur kernels in the set of likely blur kernels, shown as the positive exit from 330, the method may include repeating the operations illustrated in 310-320 for the remaining blur kernels in the set. This is shown in FIG. 3 as the feedback from 330 to 310. Once there are no more blur kernels in the set to be processed, shown as the negative exit from 330, the preprocessing of the blur kernel set may be complete, as in 340.

As noted above, the blur classification method illustrated in FIG. 1 may include, for each blur kernel and each pixel, computing the likelihood that a given blur kernel B(j) blurs the pixel at position P. To compute this likelihood, the system may in some embodiments make various assumptions about the nature of the values in the fictional sharp image from which the blurred image was obtained. For example, these assumptions may be based on studies of the statistics of pixel values in sharp natural images. In particular, it may be advantageous to work with the image gradients in the X and Y directions mentioned above. For example, it may be shown that that a zero mean, normal random variable distribution may be used to represent the image gradients, and that the distributions may be independent of each other. However, the standard deviation for the actual values of the gradients in the window around a given pixel may be unknown.

Note that the $i^{th}$ filter response of the power spectrum of such a fictitious sharp image may also have a zero mean, normal distribution, and its standard deviation may be S*A where S is the standard deviation of the pixel values in the window, and A is the L2 norm of the $i^{th}$ filter. In some embodiments, it may be convenient then to normalize all of the filters ahead of time (i.e. prior to applying them in a blur classification exercise) to have an L2 norm of 1. Thus, the values in the power spectrum of a window may have the same standard deviation, S. If the filters are orthogonal to each other, the distributions may be independent as well. In some embodiments, the filter elements may also be orthogonal to each other. However, in other embodiments this may not be strictly necessary, and adjustments may be made to the blur classification techniques described herein to correct for a lack of orthogonality.

Note that if all of the pixels in the image window are blurred by the $j^{th}$ blur kernel, B(j), it can be shown that the resulting power spectrum will be the element-wise product of the power spectrum of the un-blurred window with the power spectrum of the blur kernel. In some embodiments, the power spectrum for the blur kernel may be computed as described above. If the standard deviation S of elements in the window were known, then the probability distribution of the $i^{th}$ element in the power spectrum of the blurred window may be described as a zero mean, normal distribution with standard deviation S*U(j, i), where U(j,i) is the $i^{th}$ element of the power spectrum of the $i^{th}$ blur kernel. Using a Bayesian approach, the probability that the elements in the blurred power spectrum actually came from normal distributions with those standard deviations may be computed as follows:

$$L(p,j) = \Pi \exp(-(R_x^2(p,i))/(2(U(j,i)^2 S^2 + Z^2)))/\sqrt{U(j,i)^2 S^2 + Z^2} \quad \text{(Eq. 1)}$$

In this example, Eq. 1 may be used to compute the likelihood that the power spectrum of the X gradient of the window around pixel P came from blur kernel j. By replacing $R_x$ with $R_y$, the same equation may be used to compute the likelihood with respect to the Y gradient, as follows:

$$L(p,j) = \Pi \exp(-(R_y^2(p,i))/(2(U(j,i)^2 S^2 + Z^2)))/\sqrt{U(j,i)^2 S^2 + Z^2} \quad \text{(Eq. 1)}$$

In this example, L(p,j) may be computed as the product of these two likelihoods (the one computed for the X gradient and the one computed for the Y gradient.)

Note that Eq. 1 and its equivalent in the Y gradient are also functions of the unknown standard deviation S. Since S is unknown, the system may in some embodiments be configured to solve for the value of S that maximizes each of these functions, and then to plug that S back into Eq. 1 (and its equivalent in the Y gradient) to compute the probability that pixel P was blurred with blur kernel j. This maximizing procedure may be justified by various theoretical arguments, which are not discussed here. Note that it may be useful to save the value of S that maximizes the likelihood, as this may provide an estimate of the standard deviation of the pixels in the window around P in the fictitious sharp image. As described in more detail below, that S may be useful in resolving some ambiguities, in some embodiments.

As described above, in some embodiments, the system may compute all the values in the array L. In some embodiments, a final step in the computation of the values stored in L may be that for each pixel, P, the probability values stored in L are normalized so that their sum is one. In such embodiments, the sum of L(P, j) for j=1 to M may be computed, then each of the L(P, j) values may be divided by this sum. Thus, the values in L(P, j) for a given pixel P may represent a true probability distribution for the pixel P being blurred by a set of different blur kernels.

Figure 4:
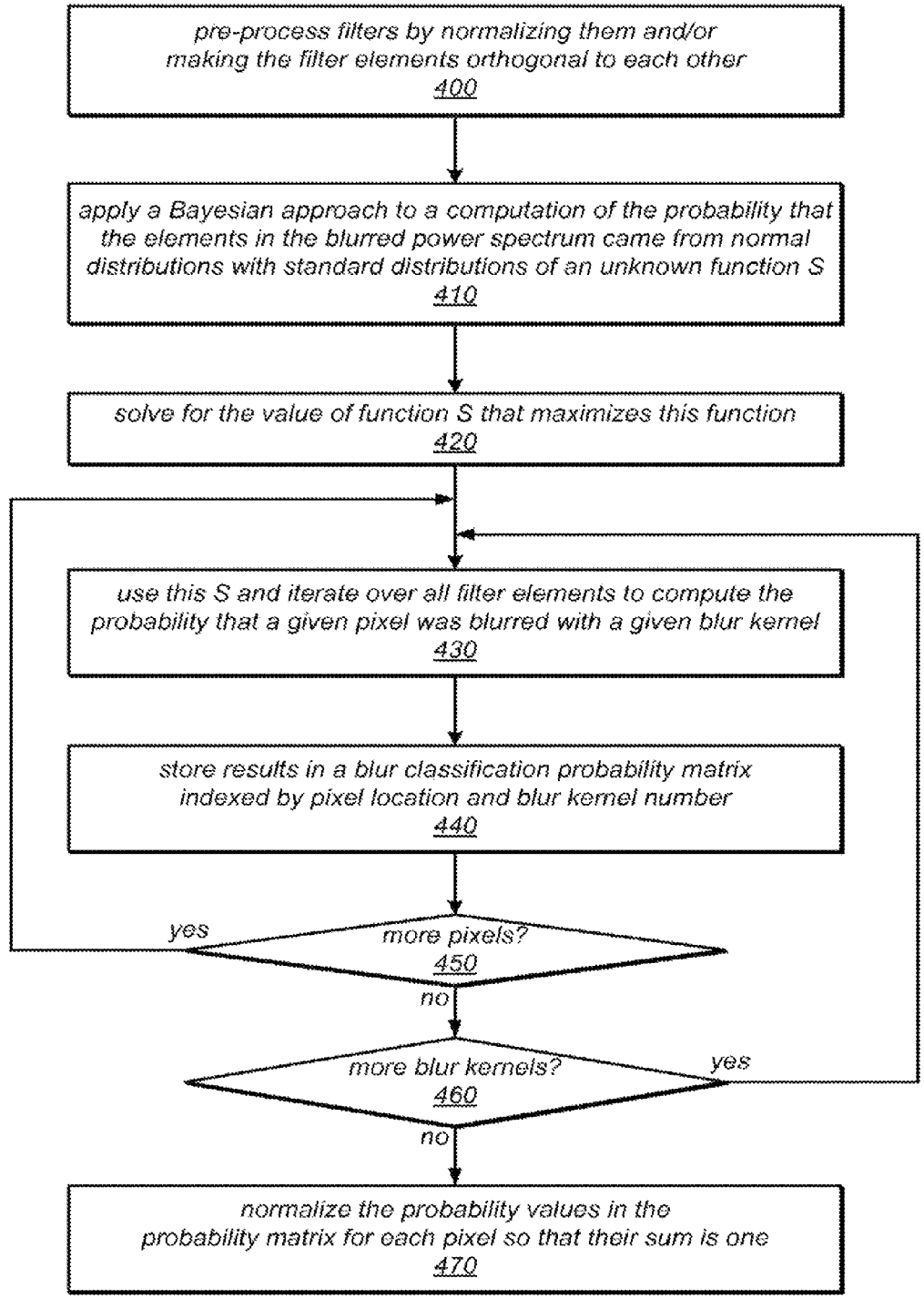
FIG. 4 is a flow diagram illustrating a method for computing the values stored in a blur classification probability matrix, according to some embodiments.

FIG. 4 is a flow diagram illustrating a method for computing the values to be stored in a blur classification probability matrix, according to some embodiments. In various embodiments, the operations illustrated in FIG. 4 may be implemented in software, in hardware, or in a combination of hardware and software. For example, in some embodiments, they may be performed by one or more modules of an image editing application or by one or more standalone software modules configured to perform them. As illustrated at 400 in this example (and described above), the method may include preprocessing the filters to normalize them and/or to make the filter elements orthogonal to each other. As illustrated at 410, the method may include applying a Bayesian approach to a computation of the probability that the elements in the blurred power spectrum came from normal distributions with standard distributions corresponding to an unknown function S. The method may include solving for the value of S that maximizes this function, as in 420.

Once an appropriate function S has been determined, the method may include using this function and iterating over all filter elements to compute the probability that a given pixel was blurred with a given blur kernel, as described above. This is illustrated in FIG. 4 at 430. The results of this computation may be stored in a blur classification probability matrix, as in 440. As shown in this example, the results may be stored in the matrix in a location indexed by the location of the given pixel in the digital image and the blur kernel (e.g., the blur kernel number). If there are more pixels for which to compute a probability value, shown as the positive exit from 450, the method may include repeating the operations illustrated at 430-440 may be repeated for each of the pixels of the image (or portion thereof) for which the probabilities are being computed.

If there are no more pixels for which to compute a probability value with respect to the given blur kernel, shown as the negative exit from 450, but there are additional blur kernels in the blur kernel set for which probability values are to be computed, shown as the positive exit from 460, the method may include repeating the operations illustrated at 430-450 for each of the remaining blur kernels in the blur kernel set. This is shown in FIG. 4 as the feedback from 460 to 430. As described above, in some embodiments, the method may include minimalizing the probability values stored in the blur classification probability matrix for each pixel so that their sum is one. This is illustrated at 470 in FIG. 4. Note that in some embodiments, this normalization may be performed as each pixel is processed, or as each probability value is computed rather than after all of the probability values have been computed. For example, in one embodiment the method may include computing probability values for all blur kernels for a given pixel, normalizing these results, and then moving on to the next pixel.

In the preceding discussion, a few details have been omitted for the sake of clarity, and will now be described. For example, it may be assumed that there is always some noise present in the input image data. This noise is accounted for in Eq. 1 as the Z variable. Note that, in some embodiments, the effect of a large amount of noise may be that all of the likelihoods for the different blur kernels are more equal (i.e. closer in value to each other) than when there is less noise. Note also that, in some embodiments, the standard deviation of the samples in an image window, S, may have the inverse effect on this equalizing effect. For example, for a fixed noise level, when S is larger, the likelihoods may be less equal (i.e. the values may be farther from each other) than when S is smaller. The ratio of S to Z is the signal-to-noise ratio of the image. In some embodiments, the smaller this signal-to-noise ratio is, the more the likelihoods will be equal (i.e. the more alike their values may be). Note that there may be parts of an image in which there is very little variation in the light level, such as in flat areas of a picture. In these areas, the technique described so far may have a hard time determining the correct blur kernel. As described in more detail below, this situation may be improved by using data from nearby pixels where the data may be more certain.

Another detail that has been glossed over above is the fact that there may be many image windows that contain pixels that have been blurred to differing degrees. In this case, as in the low signal-to-noise ratio case, the results of the above analysis may be ambiguous, and the likelihoods computed may be spread out over a number of (essentially) equally likely blur kernels. Again, the techniques discussed below may improve the results. For example, such windows may typically be straddling a boundary between an in-focus and out-of-focus object, and there may be a sharp color boundary nearby. The system described herein may in some embodiments be configured to find the correct boundary between blurred and not blurred regions by snapping to the nearest color boundary.

Techniques for computing the value S, which is the estimated standard deviation of pixels in a window of the fictitious sharp image, are discussed above. Note that these techniques may yield a different value of S for each pixel position, p, and each blur kernel B(j). In some embodiments, S may be constructed as an array with the same dimensions as the probability matrix L, such that S(p, j) gives the standard deviation estimate of the sharp image at pixel p assuming it was blurred with blur kernel B(j). There are a number of improvements that may be made in the speed of these computations using these S values, as discussed in the following paragraphs.

One improvement in the calculation of S may speed up the time to compute the probability matrix by an order of magnitude. As noted above, S may be computed as the value that maximized Eq. 1 for a fixed pixel p and blur kernel B(j). In some embodiments, this maximization may be done via iterative approximation (as in some existing systems). One problem with this approach may be that even though it may be possible to determine directly whether the S that is computed is optimal, if it is not, only partial improvements may be made toward the optimal value over a series of steps, and these steps are computationally time consuming. In some embodiments, an alternate approach that may be less computationally expensive may be to estimate S directly from the blurry image as follows.

Recall that S is an estimate of the standard deviation of the pixels in the window around pixel p in the fictitious sharp image. Note that blurring an image tends to smooth out the image values. Thus, the standard deviation of pixel values in the blurred image may typically be less than that of the corresponding pixels in the sharp image. In fact, given various assumptions about the statistics of the image gradients, the amount to which the standard deviation will be attenuated in by a given blur kernel may be predicted. For example, is has been found that ignoring the additive noise in the image model may tend to yield the best results. In some embodiments, the following attenuation coefficient may be computed for blur kernel B(j):

$$K_j = \sqrt{\Sigma_u B(j,u)^2} \qquad \text{Eq. 2}$$

In this example, Kj represents the attenuation factor and B(j, u) represents the element of the blur kernel at a given offset u from the central pixel, which may be defined to be at position (0,0). The sum may be taken over all u for which the contribution is non-zero. The coefficient may be used to predict the value of S as follows:

$$S_{sharp}(p,j) = S_{blur}(p)/K_j \qquad \text{Eq. 3}$$

In this example, $S_{sharp}$ represents the usual S as above, and $S_{blur}$ represents the standard deviation of the blurred image around pixel p. Since the blurred image is available, $S_{blur}$ may be computed directly, and thus S may be computed using the formulas above. It may be useful to keep the value estimated by this technique above a certain minimum value, e.g., about 1E-8. In some embodiments, this version of S may be used with Eq. 1 to compute the likelihoods directly, i.e. without having to employ the slower, iterative computation. In some embodiments, the results of this technique have been found to be almost as good as those obtained using the iterative computation, while the computations may be much faster.

In some embodiments, these computations may be further improved by using the value computed by equations 2 and 3 above as the starting point in the iterative computation of S. This may eliminate the small loss of quality from using the faster technique, while still saving a great deal of time.

As previously noted, the window size is a critical parameter that may affect the accuracy and reliability of the computation of the values to be stored in the blur classification probability matrix. In some embodiments, it may be advantageous to have the accuracy advantage of a small window size, along with the more reliable estimates that may be obtained by using a larger window. Two ways to achieve this goal are described below, according to different embodiments.

One way to obtain these advantages may be to run the computation of the probability matrix several times, using a different value for the window size each time, and to use information from some of these runs to improve the accuracy of the other runs. For example, the computation may be run first using a default or typical value for the window size parameter, e.g., 61 pixels. Where the values stored in the blur classification probability matrix indicate that there is one blur kernel clearly preferred over all others, this value may be retained for the corresponding pixel. For pixels at which two or more blur kernels are reasonably possible, the computation may be re-run using a smaller value for the window size parameter, e.g., 41 pixels. In some embodiments, during this second run, the system may be configured to re-compute likelihoods only for those blur kernels that have already been found to be probable. If, after the second run, the results indicate that the blur for some of these pixels is more likely to be due to one of these probable blur kernel (rather than being equally likely to be due to any of these probable blur kernels), that information may be retained. For pixels that are still ambiguous, the system may be configured perform additional re-computations (e.g., a third computation using a window size of 31 pixels, or even more re-computations), and may repeat the preceding update of the most likely blur kernel following each re-computation.

This method may in some embodiments yield improved results because it may first identify portions of the image that are likely blurred by more than one kernel, and then uses a smaller window to obtain a higher positional accuracy. Note that a smaller window size may typically analyze less data and thus may yield proportionately less reliable results. However, when the number of likely blur kernels has been reduced by a previous computation, a smaller window may be less likely to stray from the correct values.

Another way to improve positional accuracy of a blur classification exercise may be to first compute the values stored in the blur classification probability matrix using a large window size, e.g., 61 pixels, as above. In embodiments that employ this alternate approach, the next step may be to compute the probability matrix again, using the same initial window size, but "deleting" pixels q from the window around pixel p for which the likelihood of blur kernel B(j) in the previous probability matrix is below a predetermined threshold, e.g., 1/10. In this example, "deleting" these pixels from the computation may mean that evidence from that pixel, q, may not be considered in computing the likelihood for B(j) at p. Deleting pixels from consideration may in some cases introduce a complication in the computation of the likelihood in that the resulting window around p may be irregular and may be missing pixels. In this example, an analog of Eq. 1 may still be employed. However, the values of the missing pixels may be allowed to vary so as to maximize the likelihood for the particular p and j. In some embodiments, this may involve an optimization over a large number of variables, but this optimization may be sped up by solving a related least squares problem.

As described above, the initial probability matrix L may in some embodiments be improved by computing a new probability matrix L' which excludes pixels from a window that are known to not follow the assumption of a constant blur across all pixels of the window. By iterating this procedure (e.g., replacing L with L' and computing a new L', and so forth) the system may in some embodiments get closer to an accurate estimation of blur even near boundaries in the image where the blur kernel changes abruptly. This is because near such a boundary the windows may be pruned so as to not consider pixels over the edge of a boundary between differently blurred pixels.

The above two improvements described above may require several computations of the blur classification probability matrix L. In some embodiments, there may be various ways to speed up the process by not computing all of the L's at all of the pixels. For example, as noted above, there may be some loss of quality in using the direct estimate of S over that computed by maximizing the likelihood. This means that for some pixels these two methods may yield different results. This may be a sign that some of the assumptions in the model are not holding, and in particular it may indicate that the assumption that the blur is constant over the window is not holding. In some embodiments, the discrepancy in the two S values may be used to indicate which pixels may need iterative improvement and which may not.

In some embodiments, this concept may be used in conjunction with the approach described above for computing the probability matrix several times using different window sizes. In such embodiments, S may be computed first using a large window size and by employing the fast direct computation method described above. Subsequently, the system may determine the pixels in the set $\{p_i\}$ for which more than one iteration of the old way of computing S is required. For the pixels not in $\{p_i\}$, the likelihood values may be computed using the large window size. For those pixels in the set $\{p_i\}$, the window size may be reduced by some amount, and S may again be computed by the direct method. Again the system may determine how many iterations are required for convergence of S, and may identify a smaller set of pixels, say $\{q_i\}$ for which yet another iteration is required. In this example, $\{p_i\}$ may be replaced with $\{q_i\}$, and the method may continue as above until the number of pixels in the set $\{q_i\}$ is small or until some preset limit on the number of iterations is reached.

As previously noted, the results of the computations described above may in some embodiments be used in subsequent computations, including (i) to compute the local blur kernel that explains the appearance of each pixel in the input image (i.e. to create a coherent blur map), and (ii) to perform a binary segmentation of the input image, such that the pixels of the input image are segmented into two classes: pixels that are considered to be in focus (or sharp) and pixels that are considered to be out of focus (or blurry). In various embodiments, both of these computations may be performed using the computed likelihoods, stored in L(P,j), that an observed pixel P is the result of a blur kernel B(j).

In some embodiments, a simple solution for (i) may be as follows: at each image pixel P, find the blur kernel that is most likely at pixel P. In such embodiments, the system may be configured to solve for $j^*(P)=\arg\max\_\{j\} L(P,j)$. The blur kernel that gives the maximum likelihood at pixel P is B(j* (P)). This may provide a solution to (i), but the result may in some cases be a very noisy and non-smooth labeling. This may be because the likelihoods themselves are noisy due to modeling assumptions that are only partially satisfied, and/or because there is a large amount of image noise. There may also be inherent ambiguities in the observed data, which may require looking at the pixels in the neighborhood to resolve the ambiguities. For example, the system may need to determine whether an observed uniform area is perfectly sharp or heavily blurred. For real world scenes, the amount of blur is typically smooth over most areas of the image. Therefore, this simple solution may likely result in an inaccurate and undesirable labeling. In some embodiments, when choosing the blur kernel at pixel P, this greedy solution may consider only the likelihoods computed for pixel P and not for any of its neighbors. In some embodiments, a more coherent blur map may be obtained by adding a smoothness term to the objective function that encourages neighboring pixels to have similar blur estimates.

There may be similar concerns for performing a binary segmentation into sharp and blurry areas, as in (ii) above. For example, a simple solution for (ii) may be as follows: at each image pixel P, mark P as sharp if the likelihood L(P,0) that there is no blur at P is greater than the likelihood L(P,>0) that there is some blur at P. In the case that blur kernels are disks of radius j, a small improvement in flexibility of this simple solution may be to specify a radius r* which represents the maximum amount of blur at a pixel that should be considered sharp. In some embodiments, using this "in-focus radius" r*, the simple algorithm may be modified such that it is configured to mark P as in focus or sharp if the likelihood L(P,<=r*)>L(P,>r*). Both versions of this simple algorithm may result in incoherent selections of what is in focus because the likelihood evidence may be imperfect and noisy, as discussed above. Therefore, the labeling may quickly switch between sharp and blurry labels in a small image area, resulting in many small, disconnected regions of sharp or blurry pixels. For real world scenes, such an unsmooth, incoherent result may typically be incorrect. Also, the true boundaries between sharp and blurry areas may tend to fall along color edges in the input image. In some embodiments, the solution to these problems may consider a neighborhood around pixel P when deciding whether to label P as sharp or blurry.

In various embodiments, there may be a common framework for obtaining coherent, desirable answers to the computations for both (i) and (ii). For example, both of these computations may be thought of as labeling problems. In (i), the labels may be the identifiers j of possible blur kernels BO, j=1, . . . , M. In embodiments in which the possible blur kernels are assumed to be disks, the labels may represent the disk radii of each of the blur kernels in the kernel set. For problem (ii), there may be only two labels: blurry (0) or sharp (1). A common objective function that may be minimized in order to produce coherent labeling may be given by the cost of an energy function E(Φ), as follows:

$$E(\Phi) = \sum_p D_p(f_p) + \sum_{(p,q) \in N} V_{pq}(f_p, f_q)$$

In this example, Φ={fp} denotes a labeling over all pixels P, N represents the set of pairs of neighboring pixels, $D_p(f_p)$ represents the cost of assigning label $f_p$ to pixel p, and $V_{pq}(f_p, f_q)$ represents the cost of assigning labels $f_p$ and $f_q$ to neighboring pixels p and q, respectively. Note the change of notation for a pixel from P to the more traditional p used in the labeling problem literature.

In some embodiments, for applications (i) and (ii), the single pixel labeling costs $D_p(f_p)$ may be derived from the blur likelihoods, and may provide the fundamental but noisy evidence for the labeling of a given pixel. The pair-wise pixel labeling costs $V_{pq}(f_p, f_q)$ may be used to encourage neighboring pixels to have similar labels (resulting in smoother results), and to encourage sharp-blurry boundaries of a binary segmentation to occur at color edges within the image.

Before describing the details of the D and V functions for applications (i) and (ii), various approaches for minimizing the labeling problem energy function E(Φ) are described. In some embodiments, casting the coherent blur estimation problem (i) and binary segmentation problem (ii) as minimum cost labeling problems may enable the system to use existing energy minimization techniques such alpha expansion and belief propagation to solve these problems. An explanation of the alpha expansion algorithm is described below, according to various embodiments.

The alpha expansion technique for minimizing the labeling problem energy function E(Φ) is a minimum graph cut technique that has been described in the literature. In some embodiments, the alpha expansion algorithm may start by setting an initial labeling Φ for all pixels in the image. For example, in various embodiments, the alpha expansion algorithm may begin by initializing all labels to the same value (such as the maximum label value) or by setting Φ for each pixel to the result indicated by the greedy algorithm described earlier. In either case, the system may then iterate through all possible labels a, to determine whether the current labeling Φ can be improved (i.e. to determine whether the energy E(Φ) decreased) by changing the labels of some pixels to label a. Such a change is called an a-expansion because the as in the current labeling estimate can only be expanded as a result of this step. In some embodiments, this algorithm may cycle over and over again though all the possible labels a, stopping when no further improvement can be made for any label. For each a-expansion, a minimum cut graph problem may be constructed so that cuts of the graph are in one-to-one correspondence with possible a-expansions, and the cost of the minimum cut is equal to the energy after performing the best possible a-expansion.

Figure 5:
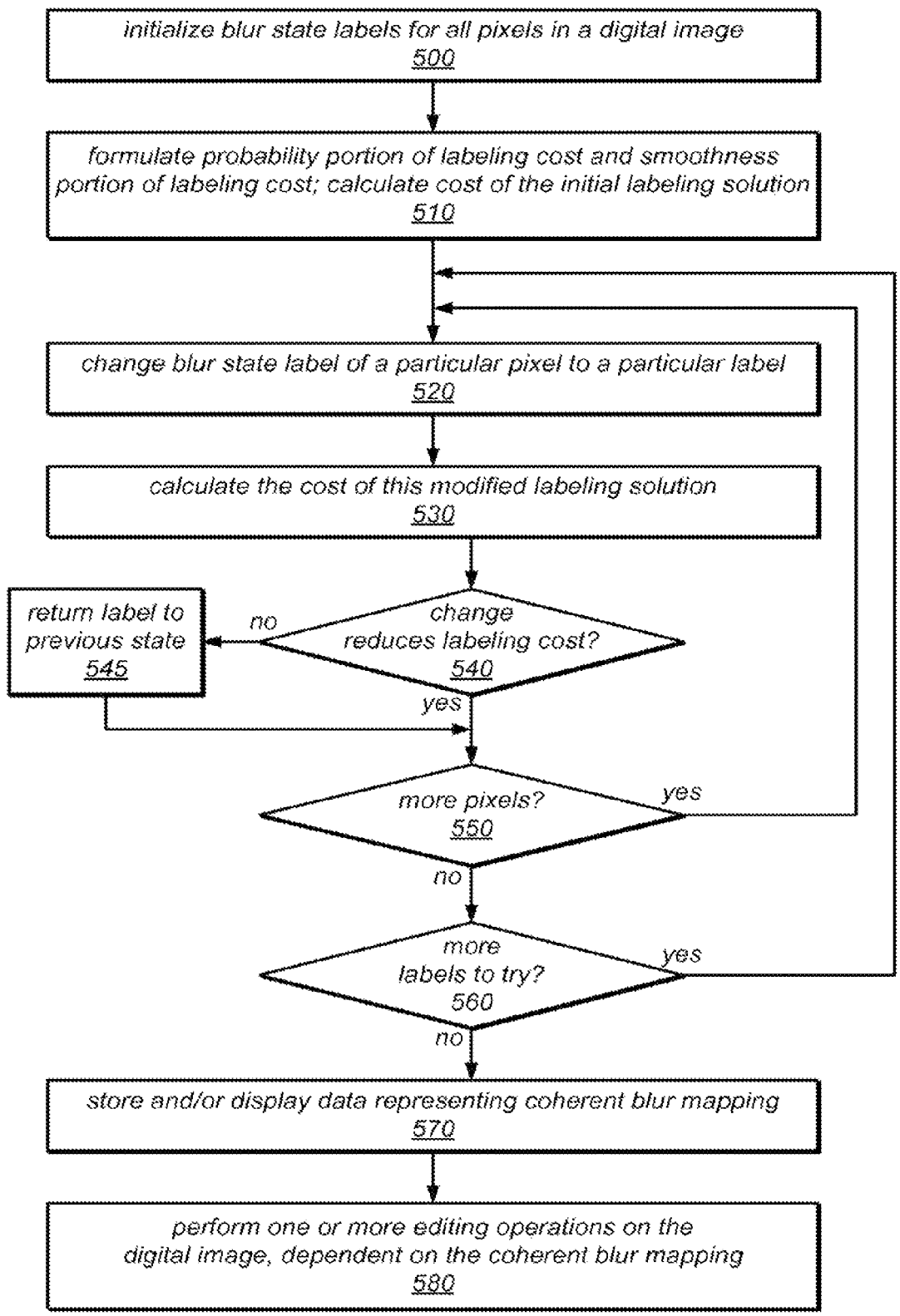
FIG. 5 is a flow diagram illustrating a method for creating a coherent blur mapping for a digital image, according to some embodiments.

FIG. 5 is a flow diagram illustrating a method for creating a coherent blur mapping for a digital image, according to some embodiments. For example, the method may be used to generate a coherent mapping between each pixel of the digital image and a respective one of a set of possible blur states indicating the degree of blur at the pixel. In various embodiments, the operations illustrated in FIG. 5 may be implemented in software, in hardware, or in a combination of hardware and software. For example, in some embodiments, they may be performed by one or more modules of an image editing application or by one or more standalone software modules configured to perform them. As illustrated at 550, in this example, the method may include initializing a set of blur state labels for all pixels in a digital image (or a portion of a digital image on which a blur classification operation is to be performed). For example, in various embodiments, the blur state of all pixels may be initialized to the same value (e.g., no blur, or a default blur value), or the blur state of each pixel may be initialized to the blur state that the corresponding values stored in a blur classification probability matrix for the digital image indicate is the most likely blur state for that pixel (e.g., according to the greedy blur classification algorithm described above). As illustrated at 510, the method may include formulating a labeling cost function (such as those described above), and calculating the cost of the initial labeling solution. For example, the labeling cost function may include a portion that is based on a blur classification probability matrix and a portion based on a configurable smoothness constraint, as described above.

As illustrated in this example, the method may include applying an alpha expansion technique to attempt to determine the lowest cost labeling solution. For example, the method may include changing the blur state label of a particular pixel to a particular (e.g., different) label (as in 520) and calculating the cost of this modified labeling solution (as in 530). If the label change does not result in a reduced labeling cost, shown as the negative exit from 540, the method may include returning the label to its previous state, as in 545 (e.g., its initial state, or a state that resulted in a reduced cost during a previous iteration of the alpha expansion exercise). If the label change results in a reduced labeling cost, shown as the positive exit from 540, the particular pixel may retain the new label (at least for this iteration of the alpha expansion exercise).

As illustrated in FIG. 5, the method may include iterating through all pixels of the digital image (or targeted portion thereof) and all possible labels until it is determined that the labeling solution results in a local or global minimum cost. This is illustrated in FIG. 5 as the feedback loop from 550 to 520, and the feedback loop from 560 to 520.

Once the alpha expansion exercise is complete, the method may include storing and/or displaying data representing a coherent blur mapping, as in 570. For example, each pixel may be assigned a blur state value representing a blur kernel identifier (which may represent a blur kernel radius, a value of another blur kernel parameter, or simply a numerical identifier of a blur kernel in the kernel set, in different embodiments). In some embodiments, this coherent blur mapping may be employed in a subsequent image editing operation, as in 580. For example, a user may be able to specify that a given editing operation (e.g., a change in lighting, color, contrast, or other image characteristics, or a cropping, scaling, or other type of image editing operation) be directed to the "subject" of a digital image, or to the "background" in a digital image. Ln such embodiments, an image editing application may be configured to perform the editing operation on portions of the image that are selected automatically based on whether the blur states of various pixels have a particular value (e.g., "blurry" or "sharp") or are within a given range of values, e.g., without the user needing to explicitly identify a "subject" of the image or the "background" portion of the image. For example, in a cropping operation targeting the subject of a digital image, the application may be configured to identify the subject based on the blur states of the image pixels, and to crop the digital image to remove some of the background pixels of the image (e.g., leaving a frame of background pixels around the subject), or all of the background pixels (e.g., isolating the subject).

As previously described, in some embodiments, the results of the methods described herein for estimating the amount of blur present at any location in a digital image may be used as an aid to depth estimation. In such embodiments, a user may invoke a depth estimation feature to estimate the depth (i.e. the distance from the camera) of one or more elements of the digital image (e.g., objects in the image or portions thereof), based on the coherent blur mapping. For example, a depth estimation tool may be configured to receive input identifying an object or a portion of a digital image for which to estimate the depth, may access a blur classification probability matrix for the digital image, and may estimate the depth of the identified object or portion of the digital image based (at least in part) on the values stored in the blur classification probability matrix and corresponding to the pixels making up the identified object or portion of the digital image.

In some embodiments, the alpha expansion algorithm described above may be applied to solve a two-label problem, as well. For example, a binary segmentation of a digital image may in some embodiments be solved by simply initializing all the labels to the maximum label value of 1, and then running a single alpha expansion step to expand the label 0. In such embodiments, only one minimum graph cut problem may need to be solved. In this case the algorithm may be guaranteed to find the labeling $\Phi^*$ that yields a global minimum of the energy $E(\Phi)$. Note that only a strong local minimum may be guaranteed for the alpha expansion algorithm when it is applied to a labeling problem with more than two labels.

In some embodiments, however, a more direct minimum graph cut problem than the alpha expansion formulation described above may be constructed to solve a two label problem, and its solution may also guarantee a global minimum energy. In such embodiments, the graph nodes to be separated by a graph cut may include the image pixels to be labeled, and two special nodes called the source and sink. In such embodiments, the graph cut formulation may include bi-directional edges connecting neighboring pixel nodes (called n-links), as well as edges from the source to each of the pixel nodes and from each of the pixel nodes to the sink (called the t-links). In this example, the edge weights on the t-links for pixel p are the D values $D_p(0)$ and $D_p(1)$, and the edge weights on the n-links between pixels p and q are the V values $V_{pq}(0, 1) = V_{pq}(1,0)$.

Note that in various embodiments, there may be many possible D and V functions that may result in coherent blur maps. As described herein, the labels may be identifiers j for the possible blur kernel B(j). For example, in some embodiments, the portion of the cost of labeling that is dependent on the computed probability may be computed as the negative log likelihood that a blur kernel j blurred a pixel p, as follows:

$$D_p(j) = -\log L(j,p)$$

In some embodiments, since the goal may be to minimize the energy over the labeling, larger likelihood values may result in lower costs/energies. This is the reason for the minus sign in the equation above. In other embodiments, the system may be configured to use the computed likelihood directly for the portion of the cost of labeling that is dependent on the probability matrix values, as follows:

$$D_p(j) = -L(j,p)$$

In some embodiments, a V function that may be used to encourage a smooth coherent blur map when a label j represents the radius of a potential disk blur kernel may be as follows:

$$V_{pq}(j_p, j_q) = \lambda |j_p - j_q|$$

Note that in this example, there would be zero cost to labeling adjacent pixels p and q with the same radius. In this example, the bigger the difference between the radii, the larger the penalty may be for labeling pixels in the same neighborhood with different radii. A generalization of this statement when the labels do not represent the radii of different disk kernels may be that $|j_p - j_q|$ represents some measure of how different the blur kernels $B(j_p)$ and $B(j_q)$ are. Note that even in embodiments in which the labels represent disk radii, other measures of the difference between the blur kernels in a kernel set may be possible and may be considered in the V function. For example, in various embodiments, the V function may be dependent on the squared difference between the radii instead of the absolute value of the difference, or may use a constant penalty for assigning any pair of different blur kernels to adjacent pixels (or pixels in the same neighborhood, e.g., within a given distance) rather than a penalty that depends on "how different" the blur kernels are.

In the example above, the parameter λ, represents a smoothness parameter on the optimal labeling. The larger the value of λ, the smoother the final labeling may be because the high cost of labeling neighboring pixels differently will encourage neighboring pixels to have similar labels. In the limit as λ→∞ (i.e. as the solution approaches maximum smoothness), the optimal labeling may approach a labeling solution in which the same label is assigned to each pixel. In the limit as λ→0 (i.e. as the solution approaches a result with no smoothness), the optimal labeling may approach the greedy labeling discussed earlier, i.e. a solution that does not consider information from the neighbors of a given pixel.

Note that the in the examples described herein, estimates S(p,j) may all refer to the fictitious sharp image discussed above. Even though this image may not be recovered exactly, it may theoretically exist. If the correct blur kernel has been chosen at each position p in the image, the corresponding S(p, j) should represent the standard deviations of a window moving over the sharp image. In some embodiments, because the pixels included in the standard deviation computation may be almost the same from one pixel p to an adjacent pixel q, the values of $S(p, j_p)$ and $S(q, j_q)$ may also be almost the same. Note again that, in this example, jp represents the choice of j for pixel p and likewise for $j_q$. When Gaussian windowed functions are used in the filter basis, the rate of change may be guaranteed to be even less.

In some embodiments, this prior constraint on S may be used to influence the choice of the blur kernel B(j) at each point in the alpha expansion algorithm, which may improve the coherence of the blur map. In such embodiments, $j_p$ and $j_q$ may be chosen such that the corresponding S values, $S(p, j_p)$ and $S(q, j_q)$ are close to each other. This bias, for example, may be included in the V part of the energy minimization function used in the alpha expansion exercise. For example, the V function described above may be modified to be as follows:

$$V_{p,q}(j_p,j_q) = \lambda |j_p - j_q| + \mu |S(p,j_p) - S(q,j_q)|$$

In this example, μ represents a weighting factor for this information.

Figure 6:
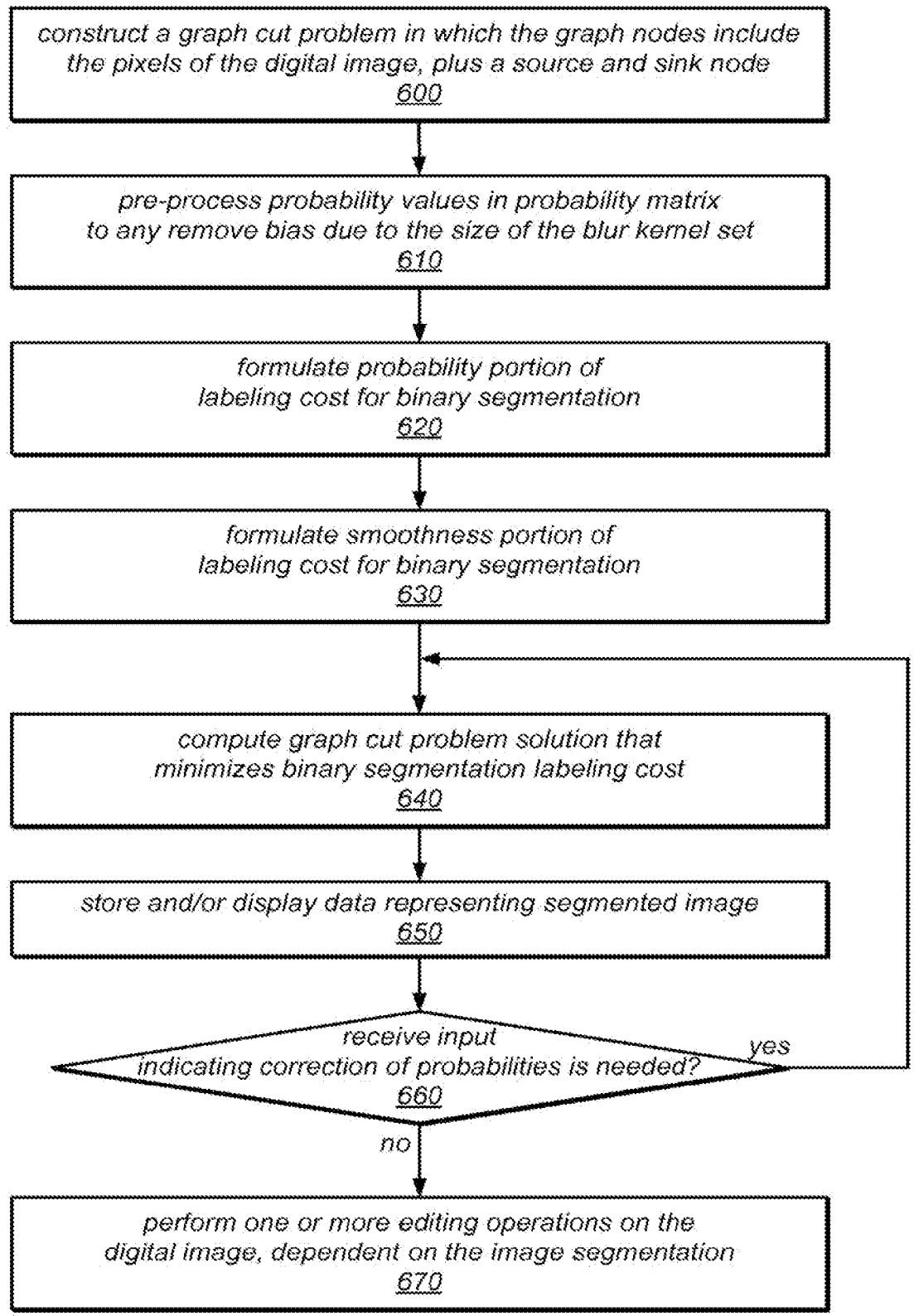
FIG. 6 is a flow diagram illustrating a method for performing a binary segmentation of a digital image into sharp and blurry regions, according to some embodiments.

FIG. 6 is a flow diagram illustrating a method for performing a binary segmentation of a digital image into sharp and blurry (i.e. out-of-focus) regions, according to some embodiments. In various embodiments, the operations illustrated in FIG. 6 may be implemented in software, in hardware, or in a combination of hardware and software. For example, in some embodiments, they may be performed by one or more modules of an image editing application or by one or more standalone software modules configured to perform them. As illustrated at 600, in this example (and described above), the method may include constructing a graph cut problem in which the graph nodes include the pixels of the digital image, plus a source node and a sink node. The graph cut problem may also include bi-directional edges that connect each image pixel to the source and sink nodes. As illustrated in this example, the method may include pre-processing the probability values stored in a blur classification probability matrix to any remove bias due to the size of the blur kernel set, as in 610.

As illustrated in FIG. 6, the method may include formulating a labeling cost function (such as those described above) for the binary segmentation. For example, the labeling cost function may include a portion that is based on values stored in a blur classification probability matrix (as in 620) and a portion based on a configurable smoothness constraint (as in 630). To compute the cost of assigning a given label to a particular pixel, probability values stored in the blur classification probability matrix and other information described above may be plugged into these portions of the cost function.

In some embodiments, the method may include computing a graph cut problem solution that minimizes the binary segmentation labeling cost, as in 640. Following the successful application of the application of the graph cut technique, the method may include storing and/or displaying data representing a segmented image, as in 650. For example, the method may include displaying a binary mask of the digital image, indicating the sharp portions and the blurry (out-of-focus) portions, in some embodiments. In some embodiments, data representing such a binary mask may be stored as an array of blur state values (0 or 1) indexed by the locations of the image pixels.

In some embodiments, a binary segmentation exercise may be refined according to user input, as described above. In such embodiments, the method may include receiving input indicating the need to correct one or more values in the blur classification probability matrix (and/or the binary segmentation result). For example, in some embodiments, an image editing application may include an interface through which a user may identify one or more "sharp" pixels that were labeled as "blurry" and/or one or more pixels that were labeled as "sharp" yet are actually out of focus. This is illustrated in FIG. 6 as the positive exit from 660. As illustrated in FIG. 6, if such input is received, the method may include modifying the probability values in the blur classification probability matrix and computing a new solution for the graph cut problem using these corrected probability values. This is shown as the feedback from 660 to 640. Note that the operations illustrated as 640-660 may be repeated two or more times to refine the results of the binary segmentation until the user no longer enters any corrections (i.e. until the user is happy with the results). This is shown in FIG. 6 as the negative exit from 660. Note that in some embodiments, similar user input may be applied to refine the results of an alpha expansion exercise or another approach that is applied to solve a labeling problem that includes more than two possible labels (not shown).

As in the example described above for creating a coherent blur mapping, the results of a binary segmentation exercise may be employed in a subsequent image editing operation, as in 670. For example, a user may be able to specify that a given editing operation (e.g., a change in lighting, color, contrast, or other image characteristics, or a cropping, scaling, or other type of image editing operation) be directed to the "subject" of a digital image. In such embodiments, the image editing application may be configured to perform the operation on portions of the image for which the blur state label is "sharp". Similarly, a user may be able to specify that a given editing operation be directed to the "background" in a digital image, and the image editing application may be configured to perform the operation on portions of the image for which the blur state label is "blurry".

As previously noted, there may be many possible D and V functions that may result in coherent binary segmentations into in focus (sharp) regions and out-of-focus (blurry) regions, in different embodiments. Consider, for example, embodiments in which the possible blur kernels are disks having different radii. In some embodiments, an in-focus radius parameter r* may be used to denote the break point between blur radii that result in pixels considered sharp and blur radii that result in pixels considered blurry. As in the non-binary blur estimation problem described in the previous section, the D function may be derived from the blur likelihood evidence as follows:

$$D_p(0) = -\log \Sigma_{r>r^*} L(r,p) \text{ and}$$

$$D_p(1) = -\log \Sigma_{r \leq r^*} L(r,p)$$

In this example, label 0 represents a blurry pixel and label 1 represents a sharp pixel. In this example, it may be assumed that likelihoods L(r,p) for each pixel have been normalized to sum to 1 over the possible radii r. In this example, the sum in the definition for $D_p(0)$ represents the probability that the true radius r is greater than the in focus radius r*. In some embodiments, the larger that probability, the more likely it may be that p should be labeled as blurry, and the smaller the cost (as shown by the negative sign in the formula above). In this example, the sum in the definition for $D_p(1)$ represents the probability that the true radius r is less than or equal to the in-focus radius r*. In some embodiments, the larger that probability, the more likely it may be that p should be labeled as sharp, and the smaller the cost.

In some embodiments, in order to encourage segmentation boundaries to fall along image edges, the system may use the following V function:

$$V_{pq}(0,0) = V_{pq}(1,1) = 0$$

$$V_{pq}(0,1) = V_{pq}(1,0) = \lambda \exp\left(-\frac{\|I(p) - i(q)\|^2}{2\sigma^2}\right) \frac{1}{\|p-q\|}$$

Note that this is a standard formulation used in segmentation problems. In this example, I(p) represents the color of the input image at pixel p. In this example, there is no penalty for assigning the same label (both sharp or both blurry) to adjacent (or neighboring) pixels. Thus smooth and coherent results are preferred. However, the cost to assign neighboring pixels p and q to different labels may be high if the color similarity at p and q is high. This may be desirable because such a labeling may tend to avoid placing a segmentation boundary at a place in the image that is not an edge in the image. In this example, the cost of assigning different labels at neighboring pixels may be low if the color similarity is low. This may be allowable because such a labeling may tend to put a segmentation boundary along an image edge. As described above, in some embodiments, a parameter λ, may be used to control the smoothness and/or coherence of the optimal segmentation and to place an importance on defining a segmentation boundary along an edge in the image. In this example, the final term in the V function is the inverse distance between pixels. This term may give a smaller weight to the diagonal neighbors of a given pixel than to its horizontal and vertical neighbors.

There may be variations in the formulation described above that may produce similar results, in other embodiments. For example, in some embodiments, different measures of color difference may be used, such the L1 norm instead of the squared L2 norm. In some embodiments, different functions may be used to convert color distances to color similarity, e.g., using one function over the color distance instead of the exponential of the negative color distance squared. In some embodiments, a constant penalty may be added for assigning different labels to any pair of pixels. This may encourage a segmentation boundary of minimal Euclidean length and may result large blocks of pixels being assigned the same label (resulting in coherent segmentations).

As described above, the number of blur kernels considered may bias the computation in an undesirable way in regions of uniform color. In such regions, every blur kernel with support smaller than the region may appear to be equally likely. For example, suppose that the in-focus radius r* is fixed, e.g., r*=1. Further suppose that p is in the middle of a large constant image area. If 5 radii are considered (e.g., r=0, 1, 2, 3, 4), then the probability of each radius is 1/5, and the probability that the true radius is less than or equal to r* is 2/5=0.4 (adding the evidence for r=0 and r=1 because r*=1). If, however, 10 radii are considered (e.g., r=0, 1, 2, . . . , 8, 9), then the probability of each radius is 1/10, and the probability that the true radius is less than or equal to r* is 2/10=0.2 (again adding evidence for r=0 and r=1 because r*=1). However, in the situation that a uniform blur is actually likely, the cost of labeling a pixel as sharp should be the same as the cost of labeling the pixel as blurry (since there is nothing else that can be concluded by looking at the blur likelihoods in isolation for that pixel).

In some embodiments, the bias described above may be corrected by using the variance v of the blur likelihood values L(1,p), . . . L(M,p) for the M possible blur kernels B(j). In such embodiments, if v is zero, this may represent the case in which there is an exact uniform blur likelihood (i.e. all likelihood values are the same). If v is small, the situation may be close to a uniform blur likelihood. As v increases, the blur likelihood may be less uniform, and the problem described may be less severe. Therefore, in some embodiments, the following may be used to correct for the bias described above:

$$P_0 = \Sigma_{r>r^*} L(r,p), P_1 = \Sigma_{r \leq r^*} L(r,p),$$

and $$\rho = C/v, \text{ for some constant } C.$$

Note that in this example, $P_0$ and $P_1$ may be used to define the costs $D_p(0)$ and $D_p(1)$, and ρ may represent the degree to which the uniform blur likelihood problem exists (wherein ρ=∞ represents the case of an exactly uniform blur likelihood). In this example, ρ may be used to adjust the $P_0$ and $P_1$ in the costs $D_p(0)$ and $D_p(1)$ as follows:

$$\hat{P}_0 = \frac{0.5\rho + P_0}{\rho + 1} \text{ and}$$

$$\hat{P}_1 = \frac{0.5\rho + P_1}{\rho + 1}$$

Note that in this example, when ρ=∞ (e.g., in the case of an exactly uniform blur likelihood), the result is $P_0 = \hat{P}_1 0.5$, as desired.

Note that when ρ=0 (e.g., in the case of a blur likelihood very different from a uniform blur), there will be no correction to the original formulation, since $\hat{P}_0 = \hat{P}_0$ and $\hat{P}_1 = \hat{P}_1$.

Figure 7A:
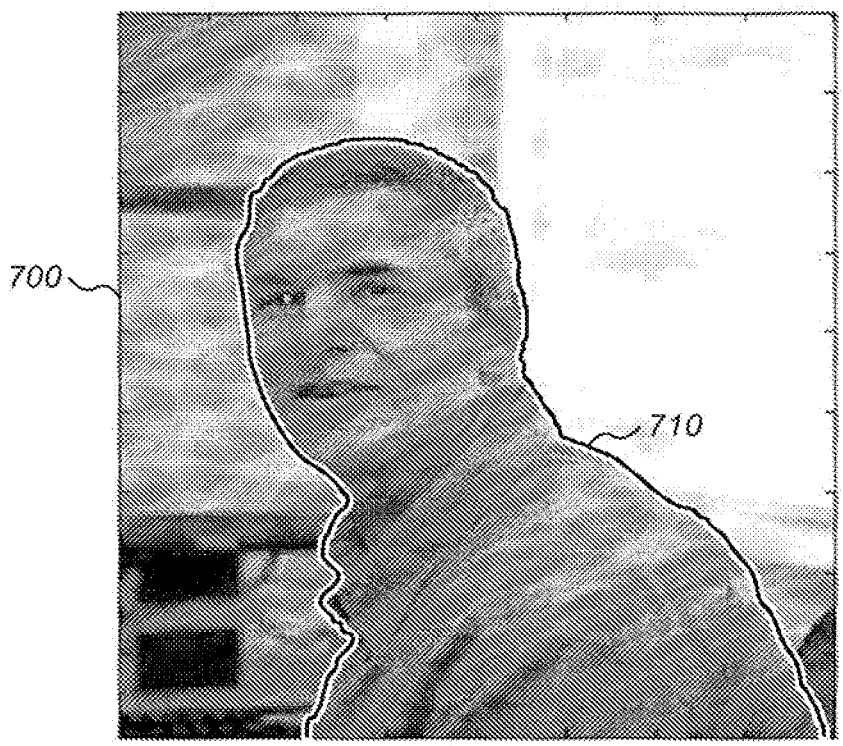
FIG. 7A illustrates a digital image in which a sharp region and a blurry region have been identified for segmentation, according to some embodiments.
Figure 7B:
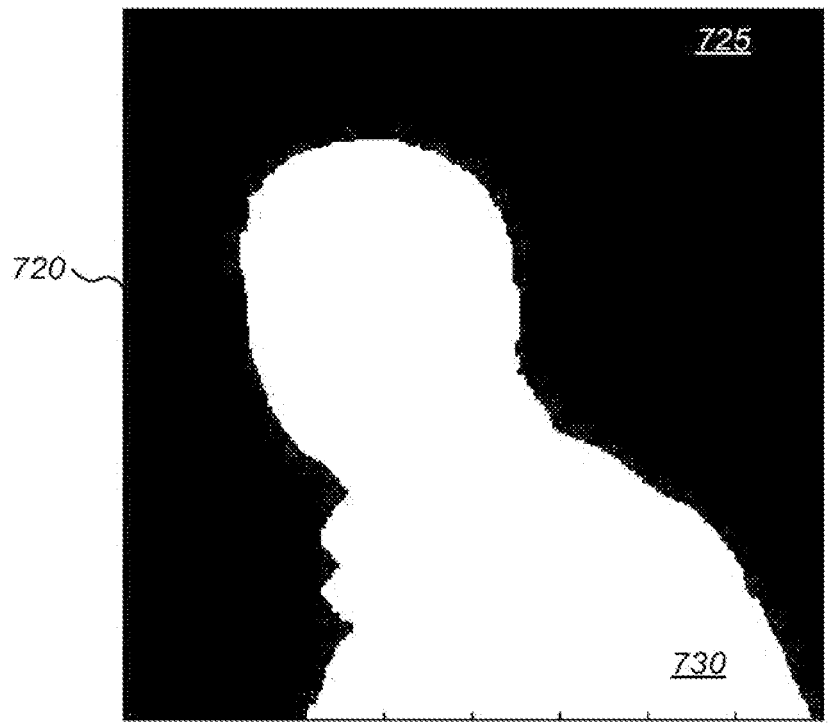
FIG. 7B illustrates a binary image mask representing the results of the segmentation of the image shown in FIG. 7A, according to some embodiments.

An example segmentation of an image into sharp and blurry regions using the methods described herein is shown in FIGS. 7A-7B, according to some embodiments. In this example, FIG. 7A illustrates a digital image 700 in which a sharp region and a blurry region have been identified for segmentation, according to some embodiments. Note that input image 700 may have been input as a grayscale image or may have been input as a color image and then converted to grayscale, as described above. In this example, the input image 700 includes an in-focus subject (a man) and an out-of-focus background (an office). In this example, the outline around the man in the image (labeled as 710) represents the computed boundary between the portion of input image 700 in which the pixels have been labeled as "sharp" and the portion of input image 700 in which the pixels have been labeled as "blurry" or "out-of-focus".

This segmentation was computed automatically without any user intervention. For this example, the algorithm parameters were set as follows: M=11 disk blur kernels with radii 0, 1, 2, . . . , 10, in-focus radius r*=1, noise variance=1E-3, window size=61, smoothness $\lambda$=1000.0, edge contrast $\sigma$=10.0, and C=1E-7. In this example, FIG. 7B illustrates a binary image mask 720 representing the results of the segmentation of input image 700, according to some embodiments. In this example, the white pixels in the portion of image mask 720 labeled as 730 indicate pixels labeled as "sharp" or "in focus", while the black pixels in the portion of image mask 720 labeled as 725 indicate pixels labeled as "blurry" or "out-of-focus".

In some embodiments, binary segmentation results may be improved by including color models for the sharp and blurry areas. In such embodiments, the parameters of the sharp and blurry region color models (e.g. a Gaussian mixture model) may be iteratively solved for along with the binary labeling. The procedure may be initialized with a segmentation obtained using only the blur likelihoods. Given a binary segmentation so obtained, the colors of pixels in the sharp and blurry regions may be used to find parameters of color models for these regions. These color models may be used in addition to the blur likelihoods as evidence for the next binary segmentation problem. Given the next segmentation, the color model parameters may be updated, and so on, until convergence is achieved. In some embodiments, local color models for sharp and blurry areas may be used instead of the global color models used in previous techniques. For example, local color models may account for the positions of colors in the image and may be used to model the likelihoods $P(r,g,b,x,y|sharp)$ and $P(r,g,b,x,y|blurry)$, i.e. the probabilities of observing a color, e.g., $(r,g,b)$, at location $(x,y)$ for both of the possible labels. Using local color models may in some embodiments provide discriminating labeling evidence for two distant areas with different labels but the same color.

In some embodiments, a binary segmentation may be obtained by solving a non-binary blur estimation problem and then applying a threshold to the assigned radii at r* to obtain the sharp-blurry binary segmentation. In such embodiments, a pixel may be labeled as sharp if and only if the computed blur radius r is ≤r*. In such embodiments, the smoothness costs V for the non-binary labeling problem may be modified to include an additional term that penalizes neighboring (e.g., adjacent) pixels which have been assigned blur radii that are on opposite sides of the in-focus radius r* (again, the penalty may account for a color edge that may be present at such a binary segmentation boundary). The idea and goal of the method may be to obtain a smooth, more "continuous" (i.e. less discretized) explanation of the blur behind a coherent binary segmentation.

The technique for segmenting an input image into sharp and blurry regions described above may often yield very good results, but may still not predict exactly what the user wanted in small areas of the image near the boundary between sharp and blurry portions of the image. In some embodiments, an additional means of making connections to the binary segmentation (e.g., interactively) may be introduced to encourage results that are consistent with the user's goals and/or expectations. For example, in some embodiments, once the results of the segmentation are displayed on the computer monitor, the user may use the mouse or another pointing device to indicate two types of corrections directly at a given position in the image: (1) pixels which should be classified as sharp but were classified as blurry, and (2) pixels which should be classified as blurry but were classified as sharp.

In some embodiments, this additional information may be used to alter the binary probability matrix in a straightforward way, e.g., to force the classification of some pixels to a value of 1 or 0. In such embodiments, for pixels where corrections of type (1) apply, the probability that the pixel is sharp may be set to 1, and the probability that it is blurry may be set to 0. For pixels of type (2), the corresponding opposite actions may be performed.

Note that because of the coherency enforced by the alpha expansion exercise, it may not be necessary for the user to manually indicate all of the erroneously classified pixels. Instead, it may be enough for the user to identify a small subset of such erroneously classified pixels, and then to allow the alpha expansion algorithm to snap to the nearest color boundary that respects the corrected classification. In other words, the alpha expansion operation may serve to propagate the effects of the manual correction specified by the user. In embodiments that support this user intervention, the user may easily customize the results of the automatic binary segmentation exercise.

Figure 8:
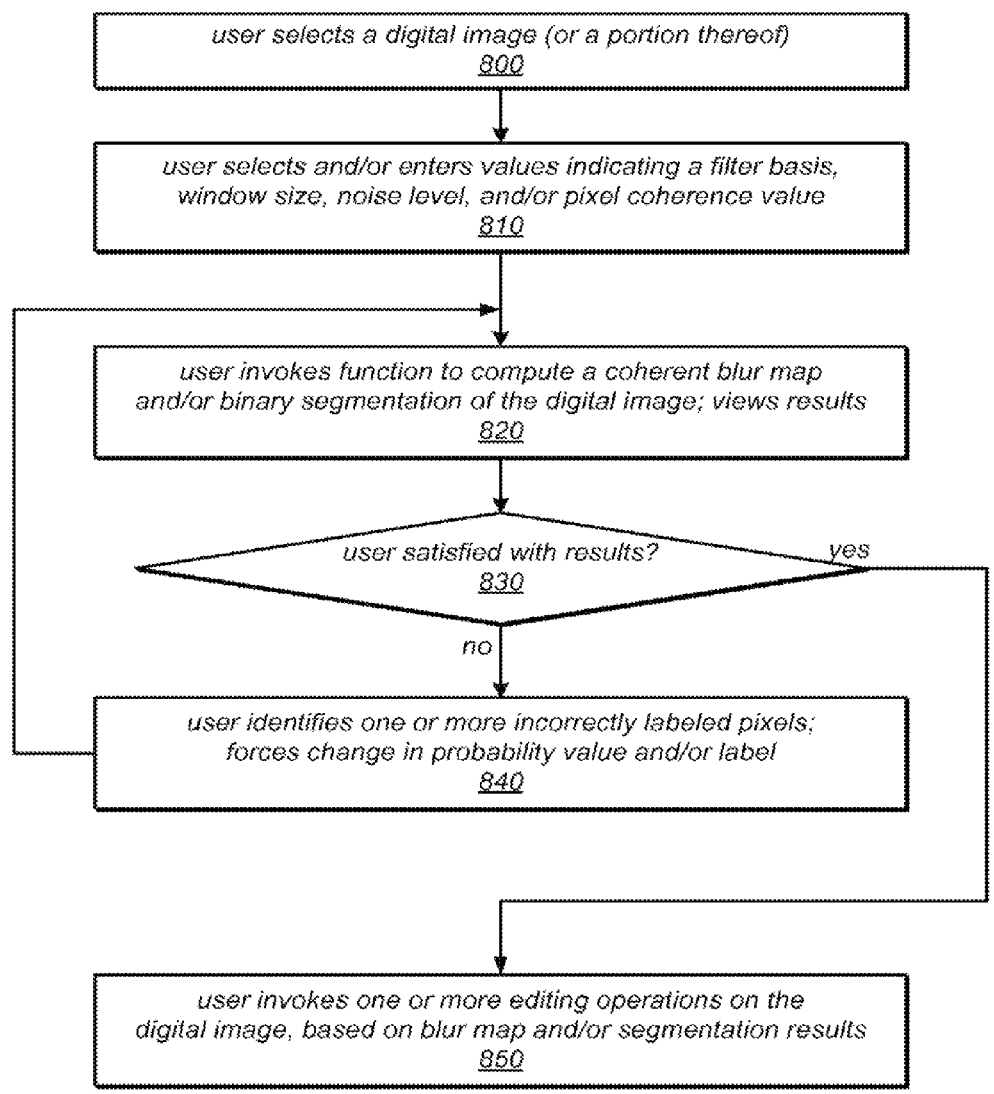
FIG. 8 is a flow diagram illustrating a method for applying the blur state classification techniques described herein to a digital image, according to some embodiments.

FIG. 8 is a flow diagram illustrating a method for applying the blur state classification techniques described herein to a digital image, according to some embodiments. In various embodiments, the operations illustrated in FIG. 8 may be implemented in software, in hardware, or in a combination of hardware and software. For example, in some embodiments, they may be performed by one or more modules of an image editing application or by one or more standalone software modules configured to perform them. As illustrated at 800, in this example, the method may include a user selecting a digital image (or portion thereof) on which to perform a blur state classification operation. The user may them select and/or enter values indicating a filter basis, window size, noise level, and/or pixel coherence value, as in 810.

As illustrated at 820, the method may include the user invoking a function to compute a coherent blur map and/or a binary segmentation of the digital image (or selected portion thereof), and viewing the results. For example, in response to the user invoking a function to compute a coherent blur map and/or a binary segmentation, the image editing application may be configured to perform any or all of the operations described herein for generating a blur classification probability matrix (e.g., based on the inputs indicated at 810) and to display the results to the user. In some embodiments, the results of a binary segmentation exercise may be displayed as a binary mask. Similarly, the results of a coherent blur mapping may be displayed graphically as an 8-bit image in which the pixels with the highest blur state values (those that are the most out of focus) appear to be white, the pixels with the lowest blur state values (those that are the most in focus) appear to be black, and other pixels appear as one of a few (or many) shades of gray, depending on their blur state values and on whether they are aggregated into a number of blur state value ranges that is less than the number of possible blur state values, in some embodiments. In other embodiments, other types of graphical or image output (e.g., graphs, plots, etc.) may be used to present the results of a coherent blur mapping exercise to a user.

If the user is not satisfied with the results, shown as the negative exit from 830, the method may include the user identifying one or more incorrectly labeled pixels (as in 840), which may force a change in the probability values and/or blur classification labels for those pixels. For example, a user interface of the image editing application may provide a pixel selection tool with which the user may select incorrectly labeled pixels in a binary segmentation mask or output image, in some embodiments. Note that in other embodiments, feedback indicating that one or more pixels were incorrectly labeled may be generated automatically in the system. In such embodiments, this feedback may be received from another module that is configured to analyze the results, rather than (or in addition to) from a user. Once the user is satisfied with the results, shown as the positive exit from 830, the method may include the user invoking one or more editing operations on the digital image (or selected portion thereof), whose performance may be dependent on the computed coherent blur map and/or the binary segmentation results, as in 850. For example, the user may specify that a given editing operation (e.g., a change in lighting, color, contrast, or other image characteristics, or a cropping, scaling, or other type of image editing operation) be directed to the "subject" of a digital image, or to the "background" in a digital image. In such embodiments, the image editing application may be configured to perform the operation on portions of the image for which the blur state has a particular value or a value within a particular range of values automatically, e.g., without the user needing to explicitly identify a "subject" or "background" portion of the image. In another example, the user may invoke a depth estimation feature to estimate the depth (i.e. the distance from the camera) of one or more elements of the digital image (e.g., objects in the image or portions thereof), based on the coherent blur mapping.

Example Implementations

Figure 9:
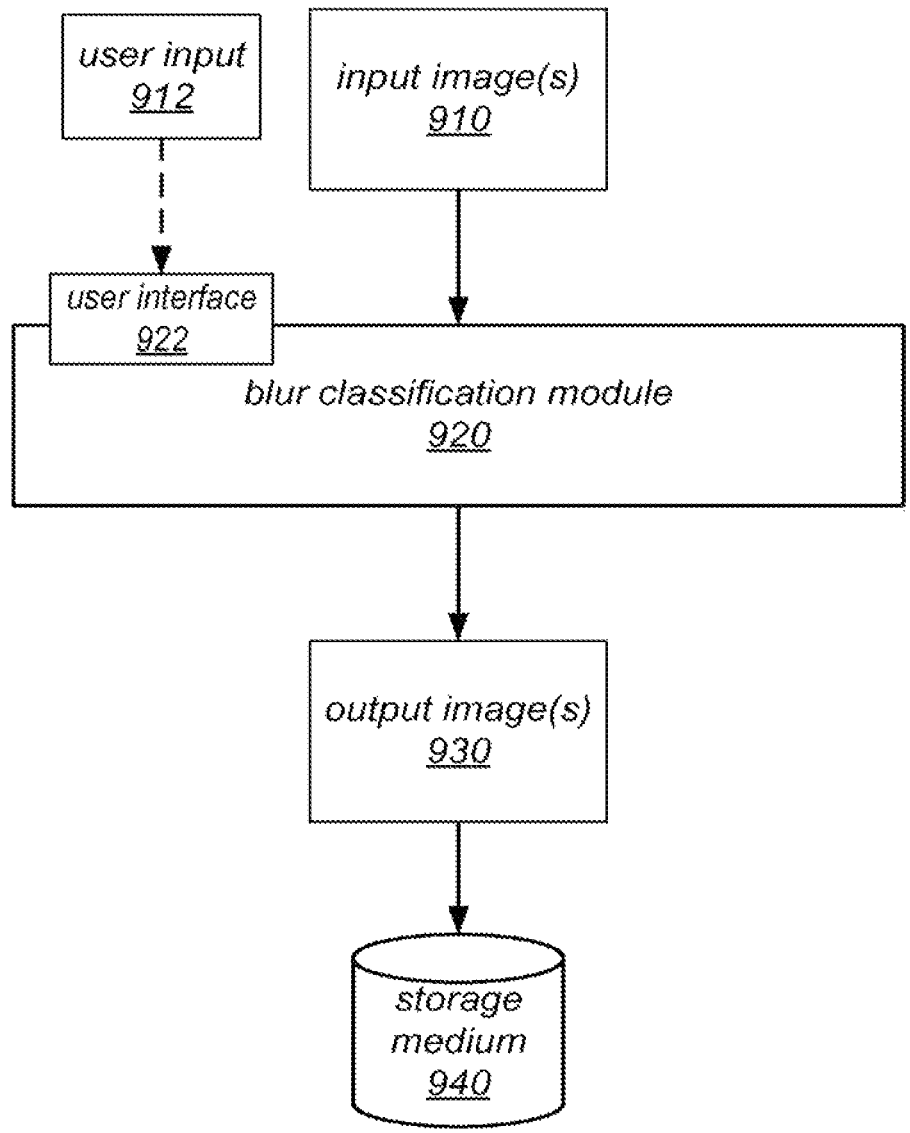
FIG. 9 is a block diagram illustrating various modules that may implement the blur state classification techniques described herein, according to some embodiments.
Figure 10:
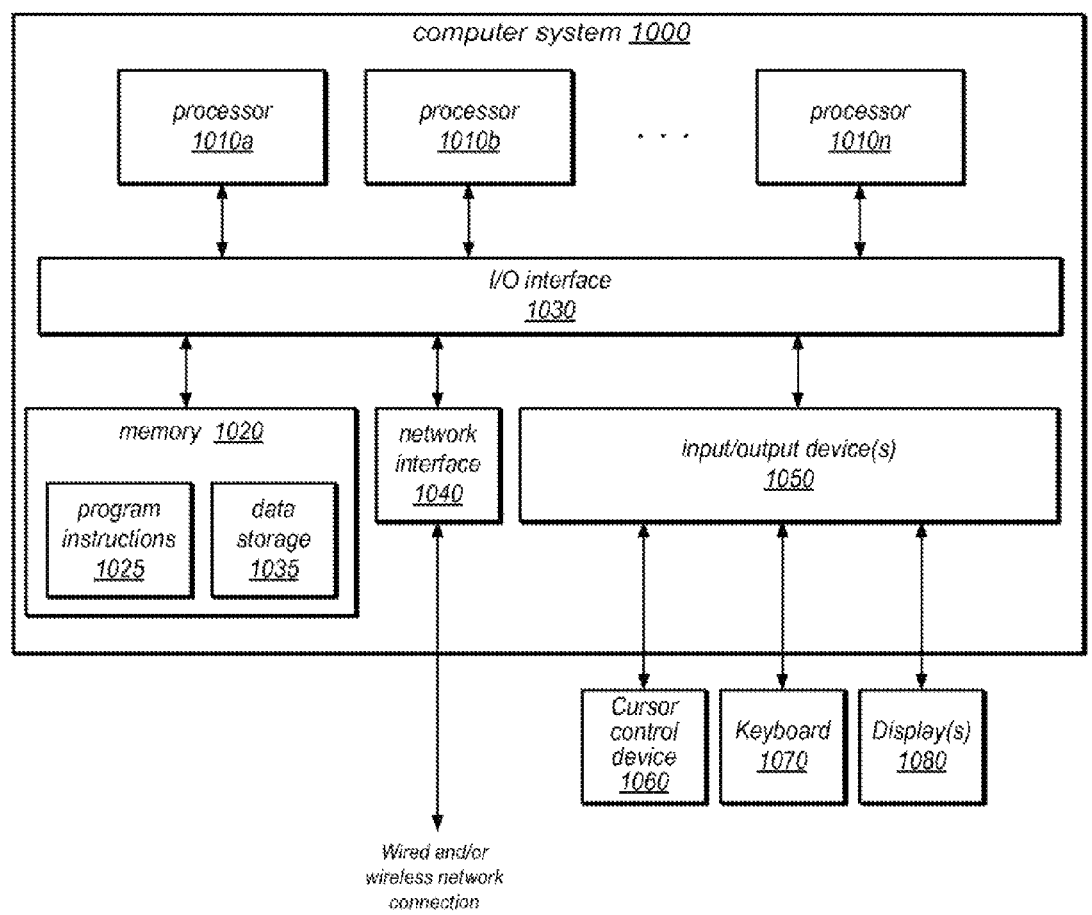
FIG. 10 illustrates a computer system that may be used to perform blur state classification of the pixels in a digital image, according to some embodiments.

FIG. 9 is a block diagram illustrating various modules that may implement the blur state classification techniques described herein, according to some embodiments. For example, FIG. 9 illustrates a blur classification module 920 that may implement one or more of the image editing techniques and tools described herein. Module 920 may, for example, implement one or more of: input image pre-processing, image window preprocessing (e.g., computing the power frequency spectrum of image windows), blur kernel pre-processing module (e.g., computing the frequency power spectrum for each blur kernel), blur classification probability matrix generation, coherent blur map generation, binary segmentation, and/or depth estimation. FIG. 10 illustrates an example computer system on which embodiments of module 920 may be implemented. Module 920 may receive as input one or more digital images 910. An example input image is shown in FIG. 2A. Module 920 may receive user input 912 specifying values for one or more parameter used by these image editing tools. Module 920 may then edit the input image(s) 910, according to user input 912 received via user interface 922, e.g., producing an output image representing a blur map and/or an image representing the results of a binary segmentation of the image into blurry and sharp regions (such as the binary image mask illustrated in FIG. 7B). Module 920 may generate this output as one or more modified images 930. Output image(s) 930 may, for example, be stored to a storage medium 940, such as system memory, a disk drive, DVD, CD, etc.

In some embodiments, module 920 may provide a user interface 922 via which a user may interact with the module 920, for example to activate various tools to perform the computations and image editing operations described herein, and/or to select or enter parameter values to be used in those computations. In some embodiments, the user interface may provide user interface elements whereby the user may select blur classification parameter values including, but not limited to, the window size, the noise level, and/or the pixel coherence. In some embodiments, user interface elements may be used to select a filter basis, to invoke the generation of a coherent blur map and/or the performance of a binary segmentation, or to invoke a depth estimation tool or another image editing operation that employs the results of the blur classification techniques described herein. In some embodiments, the user interface may provide user interface elements whereby the user may specify whether the tools should apply an iterative or direct approach to computations described herein, and/or to select, enable, or disable one or more of the alternative approaches described herein for performing various ones of the computations described.

In various embodiments, the blur classification module described herein may include and/or call other modules to perform various functions of the blur classification module. For example, different modules or sub-modules may be configured to perform input image pre-processing, image window pre-processing (e.g., computing the power frequency spectrum of image windows), blur kernel pre-processing module (e.g., computing the frequency power spectrum for each blur kernel), blur classification probability matrix generation, coherent blur map generation, binary segmentation, and/or depth estimation. Blur classification module 920 illustrated in FIG. 9 may include any or all of these sub-modules, or they may be distinct from, and called by, Blur classification module 920, in different embodiments.

Some embodiments of the systems described herein may include a means for pre-processing a digital image for input to a blur classification exercise. For example, an input image pre-processing module may access data representing a digital image and may convert the image data to a floating point format, reverse any corrections induced by the original image data format, and/or convert the image to grayscale, as described herein. The input image pre-processing module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform accessing data representing a digital image, converting the image data to a floating point format, reversing any corrections induced by the original image data format, and/or converting the image to grayscale, as described herein. Other embodiments of the input image pre-processing module may be at least partially implemented by hardware circuitry and/or firmware stored, for example, in a non-volatile memory.

Some embodiments of the systems described herein may include a means for pre-processing a window of a digital image for use in a blur classification exercise. For example, an image window pre-processing module may access pre-processed image data and may compute the power frequency spectrum of image windows of selected types and sizes centered at each pixel of the image, as described herein. The image window preprocessing module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform accessing pre-processed image data, and computing the power frequency spectrum of image windows of selected types and sizes centered at each pixel of the image, as described herein. Other embodiments of the image window preprocessing module may be at least partially implemented by hardware circuitry and/or firmware stored, for example, in a non-volatile memory.

Some embodiments of the systems described herein may include a means for pre-processing a set of blur kernels for use in a blur classification exercise. For example, a blur kernel pre-processing module may receive input indicating a set of likely blur kernels, may compute the frequency power spectrum for each blur kernel in the set, and may store the results in an array indexed by filter basis elements and blur kernel identifiers, as described herein. The blur kernel pre-processing module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform receiving input indicating a set of likely blur kernels, computing the frequency power spectrum for each blur kernel in the set, and storing the results in an array indexed by filter basis elements and blur kernel identifiers, as described herein. Other embodiments of the blur kernel pre-processing module may be at least partially implemented by hardware circuitry and/or firmware stored, for example, in a non-volatile memory.

Some embodiments of the systems described herein may include a means for generating a probability matrix whose values represent the likelihood that particular pixels of a digital image were blurred using particular blur kernels. For example, a blur classification probability matrix generation module may pre-process one or more filters, solve for a standard distribution function that maximizes the probability that elements in the blurred power spectrum came from normal distributions, and (for each pixel and each blur kernel) iterates over all filter elements to compute the probability that the pixel was blurred with the blur kernel and stores the results in a probability matrix, as described herein. The blur classification probability matrix generation module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform pre-processing one or more filters, solving for a standard distribution function that maximizes the probability that elements in the blurred power spectrum came from normal distributions, and (for each pixel and each blur kernel) iterating over all filter elements to compute the probability that the pixel was blurred with the blur kernel and storing the results in a probability matrix, as described herein. Other embodiments of the blur classification probability matrix generation module may be at least partially implemented by hardware circuitry and/or firmware stored, for example, in a non-volatile memory.

Some embodiments of the systems described herein may include a means for generating a coherent blur map for a digital image, or a portion thereof. For example, a blur map generation module may access a blur classification probability matrix for a digital image, may initialize blur state labels for all (or selected) pixels in a digital image, may formulate a labeling problem that attempts to minimize the cost of the labeling solution, and may solve the labeling problem (using an alpha expansion or another suitable method) to produce a coherent mapping of image pixels to blur state labels, as described herein. The blur map generation module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform accessing a blur classification probability matrix, initializing blur state labels for all (or selected) pixels in a digital image, formulating a labeling problem that attempts to minimize the cost of the labeling solution, and/or solving the labeling problem (using an alpha expansion or another suitable method) to produce a coherent mapping of image pixels to blur state labels, as described herein. Other embodiments of the blur map generation module may be at least partially implemented by hardware circuitry and/or firmware stored, for example, in a non-volatile memory.

Some embodiments of the systems described herein may include a means for defining a binary segmentation of a digital image (or a portion thereof) into blurry and sharp regions. For example, a binary segmentation module may access a blur classification probability matrix for a digital image, may pre-process some or all of the values in the blur classification probability matrix to remove any bias due to the blur kernel set size, may formulate a graph cut problem that attempts to minimize the cost of the binary segmentation solution, and may solve the graph cut problem to produce a binary segmentation of pixels in the digital image, as described herein. The binary segmentation module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform accessing a blur classification probability matrix for a digital image, pre-processing some or all of the values in the blur classification probability matrix to remove any bias due to the blur kernel set size, formulating a graph cut problem that attempts to minimize the cost of the binary segmentation solution, and/or solving the graph cut problem to produce a binary segmentation of pixels in the digital image, as described herein. Other embodiments of the binary segmentation module may be at least partially implemented by hardware circuitry and/or firmware stored, for example, in a non-volatile memory.

Some embodiments of the systems described herein may include a means for estimating the depth of one or more objects in a digital image dependent on a blur classification probability matrix for the digital image. For example, an image object depth estimation module may receive input identifying an object or portion of a digital image for which to estimate the depth, may access a blur classification probability matrix for the digital image, and may estimate the depth of the identified object or portion of the digital image based (at least in part) on the values stored in the blur classification probability matrix and corresponding to the pixels making up the identified object or portion of the digital image, as described herein. The image object depth estimation module may in some embodiments be implemented by a computer readable storage medium and one or more processors (e.g., CPUs and/or GPUs) of a computing apparatus. The computer-readable storage medium may store program instructions executable by the one or more processors to cause the computing apparatus to perform receiving input identifying an object or portion of a digital image for which to estimate the depth, accessing a blur classification probability matrix for the digital image, and/or estimating the depth of the identified object or portion of the digital image based (at least in part) on the values stored in the blur classification probability matrix and corresponding to the pixels making up the identified object or portion of the digital image, as described herein. Other embodiments of the image object depth estimation module may be at least partially implemented by hardware circuitry and/or firmware stored, for example, in a non-volatile memory.

Example System

Embodiments of a blur classification module as described herein may be executed on one or more computer systems, which may interact with various other devices. One such computer system is illustrated in FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a blur classification module are shown stored within system memory 1020 as program instructions 1025 and data storage 1035, respectively. In other embodiments, program instructions and/or data may be received, sent or stored upon different types of computer-accessible media or on similar media separate from system 5 memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a blur classification module as described herein, and data storage 1035, comprising various data accessible by program instructions 1025 (e.g., input image data, pre-processed image data, output image data, a blur classification probability matrix, data representing results of various image window and/or blur kernel pre-possessing operations, a binary mask representing an image segmentation, data representing a coherent blur mapping, data representing a depth estimation, various parameter values for the blur classification module, or any other data input to, output from, or produced as intermediate data by the blur classification module described herein). In one embodiment, program instructions 1025 may include software elements of embodiments of a blur classification module as illustrated in the above figures. Data storage 1035 may include data that may be used in embodiments. In other embodiments, other or different software elements and data may be included.

Those skilled in the art will appreciate that computer system 1000 is merely illustrative and is not intended to limit the scope of a blur classification module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, embodiments may be practiced with other computer system configurations.

GLOSSARY

As used herein, the following definitions apply to the terms listed below.

Gaussian function: A Gaussian function is "bell shaped curve". It has a value of 1 at 0, and falls off gradually away from zero. The standard deviation, or "sigma", of a Gaussian function is the value at which the function has fallen to about 0.24 in the positive and negative directions. The formula for the Gaussian function with independent variable x and sigma σ is as follows:

$$\exp(-x^2/2\sigma^2)$$

A 2D Gaussian function is a radially symmetric version of a Gaussian function defined on the plane. The formula for a 2D Gaussian with independent variables x and y is as follows:

$$\exp(-(x^2+y^2)/(2\sigma^2))$$

Blur Kernel: A blur kernel describes which pixels in the sharp image have been combined (e.g., averaged) to form a pixel in the blurred image. A blur kernel contains, for a set of offsets from a central pixel, a value representing the amount that the pixel offset by that amount in the sharp image contributes to the blur for the centrally located pixel. All of these "amounts" are normalized so that their sum is one in order to obtain a weighted average of sharp image pixels for the value of a blurred image pixel.

Normal Distribution: The normal distribution is a probability distribution for a random variable X such that the probability that X takes on the value x is:

$$\exp(-x^2/(2\sigma^2))/(\sqrt{2\pi}\sigma)$$

Here, σ is the standard deviation of the distribution. The expression above represents the zero-mean form of the distribution (i.e. a distribution in which the average value is 0). This form is used in the examples described herein.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link. Storage media and computer-readable storage media expressly exclude signals per se and propagating signals.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that embodiments embrace all such modifications and changes and, accordingly, the above description to be regarded in an illustrative rather than a restrictive sense.

What is claimed is:

1. A computer-implemented method comprising:
receiving input to a graphical user interface (GUI) indicating one or more of a filter basis, a window size, a noise level, or a pixel coherence value for at least a portion of an image;
computing based on the input one or more of a blur map or a binary segmentation of the image and outputting results of said computing via the GUI;
in an event that user input is received to the GUI indicating that one or more pixels of the image are incorrectly labeled in one or more of the blur map or the binary segmentation, changing one or more of a blur probability value or a blur classification label for the one or more pixels and outputting results of said changing via a change to the one or more of the blur map or the binary segmentation in the GUI; and
enabling the image to be edited based on the changed one or more of the blur map or the binary segmentation.

2. A computer-implemented method as recited in claim 1, wherein said computing occurs in response to a user invoking via the GUI a function for computing the one or more of the blur map or a binary segmentation.

3. A computer-implemented method as recited in claim 1, comprising outputting the binary segmentation as a binary mask.

4. A computer-implemented method as recited in claim 1, comprising outputting the binary segmentation as a binary mask, wherein the one or more pixels are identified as being incorrectly labeled via user selection of the one or more pixels from the binary mask.

5. A computer-implemented method as recited in claim 1, wherein the one or more pixels are identified as being incorrectly labeled via an automatic identification process.

6. A computer-implemented method as recited in claim 1, comprising outputting the blur map with pixels of the image being shaded based on their respective blur state values.

7. A computer-implemented method as recited in claim 1, comprising outputting the blur map with pixels with the highest blur state values being white, pixels with the lowest blur state values being black, and pixels between the highest blur state values and the lowest blur state values being gray.

8. A computer-implemented method as recited in claim 1, wherein said outputting results of said changing comprises separating at least one subject portion of the image from at least one background portion of the image.

9. A computer-implemented method as recited in claim 1, wherein said outputting results of said changing comprises separating at least one subject portion of the image from at least one background portion of the image, and
wherein said enabling the image to be edited comprises enabling a user to specify whether an editing operation is to be directed to the at least one subject portion or the at least one background portion.

10. A system comprising:
one or more processors; and
one or more computer-readable storage media storing computer-executable instructions that are executable by the one or more processors to cause the system to perform operations including:
receiving input to a graphical user interface (GUI) indicating one or more of a filter basis, a window size, a noise level, or a pixel coherence value for at least a portion of an image;
computing based on the input one or more of a blur map or a binary segmentation of the image and outputting results of said computing via the GUI;
receiving an indication that one or more pixels of the image are identified as being incorrectly labeled in the one or more of the blur map or the binary segmentation;
changing one or more of a blur probability value or a blur classification label for the one or more pixels to generate a changed version of the one or more of the blur map or the binary segmentation; and
enabling the image to be edited based on the changed version of the one or more of the blur map or the binary segmentation.

11. A system as recited in claim 10, wherein the operations include outputting the blur map with pixels of the image being shaded based on their respective blur state values.

12. A system as recited in claim 10, wherein the operations include outputting the blur map with pixels with the highest blur state values being white, pixels with the lowest blur state values being black, and pixels with blur state values between the highest blur state values and the lowest blur state values being gray.

13. A system as recited in claim 10, wherein said enabling the image to be edited comprises visually separating at least one subject portion of the image from at least one background portion of the image.

14. A system as recited in claim 10, wherein said enabling the image to be edited comprises:
visually separating at least one subject portion of the image from at least one background portion of the image; and
enabling a user to specify whether an editing operation is to be directed to the at least one subject portion or the at least one background portion.

15. One or more computer-readable storage media storing computer-executable instructions that are executable by a computing system to cause the computing system to perform operations including:
receiving a first input to a graphical user interface (GUI) indicating one or more of a filter basis, a window size, a noise level, or a pixel coherence value for at least a portion of an image;
receiving a second input to the GUI invoking a function to compute one or more of a blur map or a binary segmentation of the image based on the first user input;
receiving an indication that one or more pixels of the image are identified as being incorrectly labeled in the one or more of the blur map or the binary segmentation;
changing one or more of a blur probability value or a blur classification label for the one or more pixels to generate a changed version of the one or more of the blur map or the binary segmentation; and
enabling the image to be edited based on the changed version of the one or more of the blur map or the binary segmentation.

16. One or more computer-readable storage media as recited in claim 15, wherein the operations comprise outputting the blur map with pixels of the image being shaded based on their respective blur state values.

17. One or more computer-readable storage media as recited in claim 15, wherein the operations comprise outputting the blur map with pixels with the highest blur state values being white, pixels with the lowest blur state values being black, and pixels between the highest blur state values and the lowest blur state values being gray.

18. One or more computer-readable storage media as recited in claim 15, wherein the operations comprise, responsive to said receiving the second input, visually separating at least one subject portion of the image from at least one background portion of the image.

19. One or more computer-readable storage media as recited in claim 15, wherein the operations comprise, responsive to said receiving the second input, visually separating at least one subject portion of the image from at least one background portion of the image, wherein said enabling the image to be edited comprises enabling a user to specify whether an editing operation is to be directed to the at least one subject portion or the at least one background portion.

20. A system as recited in claim 10, wherein the operations further include outputting the changed version of the one or more of the blur map or the binary segmentation.

\* \* \* \* \*